US007944448B2

(12) United States Patent

Iwamura et al.

(10) Patent No.: US 7,944,448 B2

(45) Date of Patent: May 17, 2011

(54) APPARATUS AND METHOD FOR SOCIALLY INTELLIGENT VIRTUAL ENTITY

(75) Inventors: Kimihiko Iwamura, Santa Clara, CA (US); Hiroshi Nakajima, Kyoto (JP); Ryota Yamada, Mountain View, CA (US); Ritsuko Nishide, Sunnyvale, CA (US); Clifford Nass, Stanford, CA (US); Scott Brenner Brave, Mountain View, CA (US)

(73) Assignees: OMRON Corporation, Kyoto (JP); Stanford University, Stanford, CA (US)

( * ) Notice: Subject to any disclaimer, the term of this patent is extended or adjusted under 35 U.S.C. 154(b) by 1737 days.

(21) Appl. No.: 11/151,305

(22) Filed: Jun. 14, 2005

(65) Prior Publication Data

US 2006/0282493 A1 Dec. 14, 2006

(51) Int. Cl.
*G06T 13/00* (2006.01)

(52) U.S. Cl. ........................................ 345/473; 715/706

(58) Field of Classification Search ........................ None
See application file for complete search history.

(56) References Cited

U.S. PATENT DOCUMENTS

| | | | | |
|---|---|---|---|---|
| 5,367,454 | A | 11/1994 | Kawamoto et al. | |
| 5,677,997 | A | 10/1997 | Talatik | |
| 5,682,469 | A | 10/1997 | Linnett et al. | |
| 5,722,418 | A | 3/1998 | Bro | |
| 5,727,950 | A | 3/1998 | Cook et al. | |
| 5,937,397 | A | 8/1999 | Callaghan | |
| 5,987,415 | A | 11/1999 | Breese et al. | |
| 6,029,975 | A | 2/2000 | Siemers | |
| 6,201,948 | B1 | 3/2001 | Cook et al. | |
| 6,212,502 | B1 | 4/2001 | Ball et al. | |
| 6,249,780 | B1 | 6/2001 | Mizokawa | |
| 6,285,380 | B1 | 9/2001 | Perlin et al. | |
| 6,314,411 | B1 | 11/2001 | Armstrong | |
| 6,341,960 | B1 | 1/2002 | Frasson et al. | |
| 6,347,261 | B1 | 2/2002 | Sakaue et al. | |
| 6,378,075 | B1 | 4/2002 | Goldstein et al. | |
| 6,388,665 | B1 | 5/2002 | Linnett et al. | |
| 6,394,453 | B1 | 5/2002 | Siemers | |
| 6,401,080 | B1 | 6/2002 | Bigus et al. | |
| 6,427,063 | B1 | 7/2002 | Cook et al. | |
| 6,430,523 | B1 | 8/2002 | Mizokawa | |
| 6,513,011 | B1 | 1/2003 | Uwakubo | |
| 6,526,395 | B1 * | 2/2003 | Morris | 706/20 |
| 6,570,555 | B1 | 5/2003 | Prevost et al. | |
| 6,594,684 | B1 | 7/2003 | Hodjat et al. | |
| 6,606,479 | B2 | 8/2003 | Cook et al. | |
| 6,657,628 | B1 | 12/2003 | Cook | |
| 6,714,840 | B2 | 3/2004 | Sakaue et al. | |
| 6,721,706 | B1 | 4/2004 | Strubbe et al. | |
| 6,728,679 | B1 | 4/2004 | Strubbe et al. | |
| 6,731,307 | B1 | 5/2004 | Strubbe et al. | |
| 6,795,808 | B1 | 9/2004 | Strubbe et al. | |
| 7,058,577 | B2 * | 6/2006 | Surace et al. | 704/270 |
| 2005/0143138 | A1 * | 6/2005 | Lee et al. | 455/566 |

* cited by examiner

*Primary Examiner* — Said Broome

(74) *Attorney, Agent, or Firm* — Osha Liang LLP

(57) ABSTRACT

An agent that receives an input event and outputs Emotion_Response messages based on personality trait indices and emotional state indices is disclosed. The agent has a social response generator that receives an input event, an output from an emotional state register and an output from a predefined personality trait register, and updates at least one of a current state of the emotional state register or a Social_Response message stored an event buffer. The agent has an emotion generator that outputs an Emotion_Response message based on at least one of the Social_Response message stored in the event buffer, one or more outputs of the predefined personality trait register, or one or more outputs of the emotional state register. The agent operates within an environment server that provides contextual environment that facilitates interaction amongst a group of agents, which receive input events from the contextual environment and outputs emotional response messages thereto.

50 Claims, 18 Drawing Sheets

```
//------------------------------------------------------------
// Setting fixed values for personality traits of AGENT1
//------------------------------------------------------------

trait-intelligence = value1                      // 0.0 <= value1 <= 1.0
trait-conscientiousness = value2                 // 0.0 <= value2 <= 1.0
trait-extraversion = value3                      // 0.0 <= value3 <= 1.0
trait-agreeableness = value4                     // 0.0 <= value4 <= 1.0
trait-emotional-stability = value5               // 0.0 <= value5 <= 1.0

trait-social-status-of(AGENT1) = value6          // 0 < value6
trait-social-status-of(AGENT2) = value7          // 0 < value7
trait-social-status-of(AGENT3) = value8          // 0 < value8

//------------------------------------------------------------
// Setting default values for emotional states of AGENT1
//------------------------------------------------------------

state-emotion = value9                           // -1.0 <= value9 <= 1.0
state-confidence = value10                       // -1.0 <= value10 <= 1.0

state-liking-for(AGENT1) = value11               // -1.0 <= value11 <= 1.0
state-liking-for(AGENT2) = value12               // -1.0 <= value12 <= 1.0
state-liking-for(AGENT3) = value13               // -1.0 <= value13 <= 1.0
```

*FIG. 7*

```
Task_FeedbacK(sender, receiver, degree){

// for agent receiving an input event
If ( myself = receiver ) {
        If ( ( state-confidence > (Threshold-1) ) and (degree > 0) ){ Unexpected_Event(sender, receiver, degree)}
        If ( ( state-confidence < (Threshold-2) ) and (degree < 0) ){Unexpected_Event(sender, receiver, degree)}
        delta-emotion = (1 – trait-emotional-stability)
                        x trait-conscientiousness
                        x (trait-social-status-of(sender)/(trait-social-status-of(sender)+trait-social-status-of(receiver)))
                        x degree
        state-emotion = capAt1(state-emotion + delta-emotion)
        state-liking-for(sender) = capAt1(state-liking-for(sender)+ delta-emotion x (1-|state-liking-for(sender)|) )
        state-confidence = capAt1( state-confidence + degree x (Weight-1) +trait-extraversion x (Weight-2) )
}

// for agent sending an input event or agent observing an input event
If ( myself = sender ) or ( myself = observer ) {
        state-emotion = capAt1(state-emotion + {(1 – trait-emotional-stability)
                        x ( (state-liking-for(receiver) + (2 x trait-agreeableness -1))/ 2 )
                        x degree })

        If ( trait-social-status-of(receiver) = social-status-of(myself) ){
                state-confidence = capAt1( state-confidence + {(2 x trait-agreeableness -1) x degree x (Weight3) } ) }
}

// for all agents
If ( state-emotion > 0 ) and ( state-liking-for(receiver) > 0 ) and
        ( trait-social-status-of(receiver) <= trait-social-status-of(myself) ){
        setDesiredBehavior(Social_Feedback, receiver, |degree | x state-liking-for(receiver) x state-emotion)
}
Else if ( state-emotion < 0 ) and ( state-liking-for(receiver) > 0 ) and
                ( trait-social-status-of(receiver) <= trait-social-status-of(myself) ){
        setDesiredBehavior(Social_Feedback, receiver, -|degree | x state-liking-for(receiver) x state-emotion)
}
Else if ( state-emotion > 0 ) and ( state-liking-for(receiver) < 0 ) and
                ( trait-social-status-of(receiver) <= trait-social-status-of(myself) ){
        setDesiredBehavior(Social_Feedback, receiver, |degree | x state-liking-for(receiver) x state-emotion)
}
Else if ( state-emotion < 0 ) and ( state-liking-for(receiver) < 0 ) and
                ( trait-social-status-of(receiver) <= trait-social-status-of(myself) ){
        setDesiredBehavior(Social_Feedback, receiver, -|degree | x state-liking-for(receiver) x state-emotion)
}
Else{
        setDesiredBehavior(null, null, null)
}
```

*FIG. 8*

```
Task_Request(sender, receiver, objective-probability-of-success){

// for receiver agent
If ( myself = receiver ) {
        state-emotion = capAt1(state-emotion + {(1 – trait-emotional-stability)
                        x state-confidence
                        x objective-probability-of-success
                        x trait-conscientiousness
                        x (trait-social-status-of(sender)/(trait-social-status-of(receiver) + trait-social-status-of(sender)))} )
}
}
```

*FIG. 9*

```
Social_Feedback(sender, receiver, degree){

// for agent that received input event
If ( myself = receiver ) {
        delta-emotion = (1 – trait-emotional-stability) x trait-extraversion x degree
        state-emotion = capAt1( state-emotion + delta-emotion )
        state-liking-for(sender) = capAt1( state-liking-for(sender) + delta-emotion )
}

// for agent that observed input event
If ( myself = observer ) {
        state-liking-for(sender) = state-liking-for(sender) + ( degree x state-liking(receiver) )
}
}
```

*FIG. 10*

```
Unexpected_Event(sender, receiver, degree){

// for agent that receives an input event
If ( myself = receiver ) {
        bufferedEvent = getEventIDFromFirstEventBuffer()
        If ( getWeightOfEvent(Unexpected_Event) >= getWeightOfEvent(bufferedEvent) )
        {
                setEventToFirstEventBuffer(Unexpected_Event, degree)
        }
}
}
```

*FIG. 11*

```
Sensory_Input(sender, receiver, degree){

// for agent receiving an input event
If ( myself = receiver ) {
        bufferedEvent = getEventIDFromSecondEventBuffer()
        If ( getWeightOfEvent(Sensory_Input) >= getWeightOfEvent(bufferedEvent) )
        {
                setEventToSecondEventBuffer(Sensory_Input, degree)
        }
}
```

*FIG. 12*

```
Sensory_Input_Gone(sender, receiver, degree){

// for agent receiving an input event
If ( myself = receiver ) {
        bufferedEvent = getEventIDFromSecondEventBuffer()
        If ( bufferedEvent = Sensory_Input )
        {
                setEventToSecondEventBuffer(null, null)
        }
}
}
```

*FIG. 13*

```
Danger_Response(sender, receiver, degree){

// for receiver agent
If ( myself = receiver ) {
        bufferedEvent = getEventIDFromSecondEventBuffer()
        If ( getWeightOfEvent(Danger_Response) >= getWeightOfEvent(bufferedEvent) )
        {
                setEventToSecondEventBuffer(Danger_Response, degree)
        }
}
}
```

*FIG. 14*

```
Danger_Response _Gone(sender, receiver, degree){

// for receiver agent
If ( myself = receiver ) {
        bufferedEvent = getEventIDFromSecondEventBuffer()
        If ( bufferedEvent = Danger_Response )
        {
                setEventToSecondEventBuffer(null, null)
        }
}
}
```

*FIG. 15*

```
Generate _Emotion ()

        // for Momentary Emotion
        if getEventForMomentaryEmotion = UNEXPECTED_EVENT and |TheDegree| > Cb
                        setEventForMomentaryEmotion(null,0)
                            return SURPRISE

        // for Short-Lived Emotion
        if getEventForShortLivedEmotion = DANGEROUS_EVENT
                    if getEventToReactDegree >= Cc
                        return FEAR_RADICAL
                if Cc > getEventToReactDegree > Ce
                            return FEAR
        if getEventForShortLivedEmotion = SENSORY_INPUT and TheDegree < Ca
                        return DISGUST
        if getLikingAverage < Cd
                return DISGUST

        // for Lasting Emotion
        if state-emotion > CONST2 return HAPPY_EXTREMELY
        if CONST2 >= state-emotion > CONST3 return HAPPY
        if CONST3 >= state-emotion > CONST4 return HAPPY_SLIGHTLY
        if CONST4 >= state-emotion >= CONST5 return NEUTRAL
        if CONST5 > state-emotion >= CONST6 and trait-agreeableness >= CONST return SAD_SLIGHTLY
        if CONST5 > state-emotion >= CONST6 and trait-agreeableness < CONST return ANGRY_SLIGHTLY
        if CONST6 > state-emotion >= CONST7 and trait-agreeableness >= CONST return SAD
        if CONST6 > state-emotion >= CONST7 and trait-agreeableness < CONST return ANGRY
        if CONST7 > state-emotion  and trait-agreeableness >= CONST return SAD_EXTREMELY
        if CONST7 > state-emotion  and trait-agreeableness < CONST return ANGRY_EXTREMELY
```

*FIG. 16*

```
// -----------------------------------------------------------
// TEACHER_CHOOSE_STUDENT
// -----------------------------------------------------------
Teacher_Choose_Student(choose-mode, probability-to-choose-avatar, answer-of-user-was-correct)
        tmp = getRandomValueBetween0to1()

         if choose-at-random
                  if tmp <= choose-at-random      chosen-student = avatar
                  else                            chosen-student = coleamer

        if choose-based-on-liking
                if tmp <= liking(chosen) / (liking(chosen) + liking(other))
                          chosen-student = avatar
                   else  chosen-student = coleamer

        if choose-based-on-answer
                if answer-of-user-was-correct = true and tmp <= choose-at-random
                          chosen-student = avatar
                   if answer-of-user-was-correct = true and tmp > choose-at-random
                       chosen-student = coleamer
                if answer-of-user-was-correct != true and tmp <= choose-at-random
                          chosen-student = coleamer
                   if answer-of-user-was-correct != true and tmp > choose-at-random
                       chosen-student = avatar

        if choose-based-on-answer-and-liking
                if answer-of-user-was-correct = true and tmp <= liking(chosen) / (liking(chosen) + liking(other))
                          chosen-student = avatar
                   if answer-of-user-was-correct = true and tmp > liking(chosen) / (liking(chosen) + liking(other))
                       chosen-student = coleamer
                if answer-of-user-was-correct != true and tmp <= liking(chosen) / (liking(chosen) + liking(other))
                          chosen-student = coleamer
                   if answer-of-user-was-correct != true and tmp > liking(chosen) / (liking(chosen) + liking(other))
                       chosen-student = avatar
```

*FIG. 17*

```
// -------------------------------------------------------
// TEACHER_CALL_STUDENT
// -------------------------------------------------------
TEACHER_CALL_STUDENT(difficulty)
        script-type = "call-student"
        script = getScriptOfTeacher(script-type, difficulty)
        UserInterface.speak(teacher, script)
        chosen-student = getChosenStudent()
          TASK_REQUEST(self, chosen-student, difficulty)
          DANGEROUS_EVENT(self, chosen-student, value-calculated-from-difficulty)
```

*FIG. 18*

```
// -------------------------------------------------------
// TEACHER_GIVE_ANSWER_FEEDBACK
// -------------------------------------------------------
TEACHER_GIVE_ANSWER_FEEDBACK(difficulty)
        script-type = "answer-feedback"
        script = getScriptOfTeacher(script-type, difficulty)
        UserInterface.speak(teacher, script)
        chosen-student = getChosenStudent()
        given-answer-was-correct = givenAnswerCorrect()
        if given-answer-correct = true
                TASK_FEEDBACK(self, chosen-student, difficulty)
        else
                TASK_FEEDBACK(self, chosen-student, -(1 – difficulty))
        DANGEROUS_EVENT_GONE(self, chosen-student)
```

*FIG. 19*

```
// ---------------------------------------------------------
// getScriptOfTeacher
// ---------------------------------------------------------
getScriptOfTeacher(script-type, difficulty)
        chosen-student = getChosenStudent()
        given-answer-was-correct = givenAnswerCorrect()
        if script-type = call-student
                if chosen-student.liking >= 0
                        script = "<STUDENT_NAME>, please give your answer."
                else
                        script = "What's your answer, <STUDENT_NAME>?"
        else if script-type = answer-feedback
                if given-answer-was-correct = true
                        if      desiredBehaviorID = SOCIAL_FEEDBACK
                                  and desiredBehaviorReceiver = chosen-student
                                  and desiredBehaviorDegree > SOME_VALUE
                                     script = "Good job, <STUDENT_NAME>."
                        else
                                script = "Correct."
                else
                        if      desiredBehaviorID = SOCIAL_FEEDBACK
                                  and desiredBehaviorReceiver = chosen-student
                                     script = "No, but good try <STUDENT_NAME>."
                        else
                                script = "Wrong."
        else
                script = ""
        return replaceString(script, <STUDENT_NAME>, getStudentName(chosen-student))
```

*FIG. 20*

```
//-----------------------------------------------------
// TEACHER_GIVE_ANSWER_FEEDBACK
//-----------------------------------------------------
TEACHER_ GIVE_ANSWER_FEEDBACK (difficulty)

        UserInterface.speak(teacher, "")
        UserInterface.speak(self, "")
        UserInterface.updateEmotion(self)

        chosen-student = getChosenStudent()
        desired-behabior-id = getDesiredBehaviorID()
        desired-behavior-degree = getDesiredBehaviorDegree()
        if chosen-student = self and state-confidence > Cx and !give-answer-was-correct
                UNEXPECTED_EVENT(self, self, degree)
        if chosen-student = self and state-confidence < Cx and give-answer-was-correct
                UNEXPECTED_EVENT(self, self, degree)
        if chosen-student != self and desired-behabior-id = SOCIAL_FEEDBACK
                   script-type = social-feedback
                script = getScriptOfStudent(script-type)
                UserInterface.speak(self, script)
                SOCIAL_FEEDBACK(self, chosen-student, desired-behavior-degree)
```

*FIG. 21*

```
//-----------------------------------------------------
// TEACHER_ASK_QUESTION
//-----------------------------------------------------
TEACHER_ASK_QUESTION()
        script-type = question-asked
        UserInterface.updateEmotion(self)
        script = getScriptOfStudent(script-type)
        if script != ""
                UserInterface.speak(self, script)
```

*FIG. 22*

```
// ------------------------------------------------
// STUDENT_GIVE_ANSWER
// ------------------------------------------------
STUDENT_GIVE_ANSWER(mode, correct-answer-list, incorrect-answer-list)
        chosen-student = getChosenStudent()
        answer-of-user = getAnswerOfUser()
        answer-of-user-was-correct = answerOfUserWasCorrect()
        if chosen-student = avatar
                setGivenAnswer(answer-of-user)
                setGivenAnswerWasCorrect(answer-of-user-was-correct)
        else
                answer-of-colearner = getAnswerOfColearner(mode,
                                correct-answer-list, incorrect-answer-list)
                answer-of-colearner-was-correct = member(answer-of-colearner, correct-answer-list)
                setGivenAnswer(answer-of- colearner)
                setGivenAnswerWasCorrect(answer-of- colearner -was-correct)
        if chosen-student = self
                   script-type = give-answer
                script = getScriptOfStudent(script-type)
                UserInterface.speak(self, script)
```

*FIG. 23*

```
// ---------------------------------------------------------------
// getScriptOfStudent
// ---------------------------------------------------------------
getScriptOfStudent(script-type)

        if script-type = introduction
                if trait-agreeable < 0.5 and other-student.liking < 0
                        script = "My name is <NAME>. I will beat you."
                else    script = "My name is <NAME>."

        else if script-type = question-asked
                if state-confidence >= 0  script = selectOneAtRandom("I bet I know this one."
                                                                     "This is so easy.")
                else                      script = ""

        else if script-type = give-answer
                if state-confidence >= 0  script = "<ANSWER>."
                else                script = selectOneAtRandom("Uh...ummm.... <ANSWER>.",
                                                               "Maybe.... <ANSWER>.")

        else if script-type = social-feedback
                if givenAnswerWasCorrect() == true and getChosenStudent().liking >= 0
                        script = selectOneAtRandom("Good job, <TARGET>!",
                                                   "That was hard, and you got it!")
                else if givenAnswerWasCorrect() != true and getChosenStudent().liking >= 0
                        script = selectOneAtRandom("That was a hard one.",
                                                   "You'll get the next one, <TARGET>.",)
                if givenAnswerWasCorrect() == true and getChosenStudent().liking < 0
                        script = selectOneAtRandom("Lucky guess!",
                                                   "Teacher's pet!")
                else if givenAnswerWasCorrect() != true and getChosenStudent().liking < 0
                        script = selectOneAtRandom("Ha, ha, you got it wrong!",
                                                   "You need to learn more!")
```

*FIG. 24*

APPARATUS AND METHOD FOR SOCIALLY INTELLIGENT VIRTUAL ENTITY

BACKGROUND OF THE INVENTION

Over the past several years, computers have increasingly promoted collaborative activities between groups of users. The collaboration between users can be a simple as an instant messaging discussion group, or can be a complex engineering design being developed by a group of engineers dispersed at locations around the world. Computer interfaces have matured as well, changing from the primitive text-based user interfaces of the early days of computers to multimedia-rich browser environments, as well as complex virtual environments. For example, virtual environments are used today to provide realistic scenarios to train personnel involved in occupations requiring quick decision-making, such as police work and aircraft and ship piloting. Coupled with the maturation of the user interface has been the trend towards sophisticated multi-user systems that support collaboration amongst a large group of users.

Concurrent with the rise of the Internet, software agents have become a necessary tool to manage the volume and flow of information available to an Internet user. Software agents execute various tasks as required by a particular user, and are guided by their particular programming. For example, a software agent can operate autonomously and, within that autonomous operation, react to certain events, capture and filter information and communicate the filtered information back to a user. A software agent can be designed to control their own activities, and one of skill can easily design software agents that communicate and interact with other software agents.

The types of software agents are only limited by the imagination of a software designer. A software agent can be designed to be a pedagogical agent that has speech capability (Lester, et al 1997) and can adapt their behavior to their environment (Johnson, 1998). A well-designed software agent can respond with cognitive responses, as well as affect, and their outward behavior is adapted to their particular role (Lester and Stone, 1997), (Andre et al, 1998).

An avatar is defined as the "the representation of a user's identity within a multi-user computer environment; a proxy for the purposes of simplifying and facilitating the process of inter-human communication in a virtual world." (Gerhard and Moore 1998). Within a virtual environment, avatars have a plurality of attractive traits, such as identity, presence and social interaction. Within a virtual world, an avatar is used to establish a user's presence, and they may take on an assumed persona of the user. For example, in a gaming virtual world, a mild mannered accountant may use an avatar with a persona of a mercenary soldier. It is well known that avatars can be aware of each other within a given virtual world. Moreover, an avatar can be under the direct control of its underlying user, or may have a great deal of freedom with respect to its internal state and actions. A group of avatars can initiate and continue social and business encounters in a virtual world and foster the impression that they are acting as virtual agents and have authority derived from the underlying user.

SUMMARY OF THE INVENTION

The invention has been made in view of the above circumstances and to overcome the problems and limitations of the prior art.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

In a first embodiment of the present invention, an agent comprises an interpreter that receives an input event and outputs a social event based on the interpretation of the input event, and a social response generator that receives the social event, an output from an emotional state register and an output from a predefined personality trait register. The social response generator updates at least one of a current state of the emotional state register and a social response message stored in an event buffer. The agent further comprises an emotion generator that outputs an emotion response message based on at least one of the social response message stored in the event buffer, one or more outputs of the predefined personality trait register, or one or more outputs of the emotional state register. The agent further comprises a manifester that receives the emotion response message output from the emotion generator and converts the emotion response message into a behavior message. In addition, the agent comprises a role database having social characteristics used by the interpreter to create social events and data used by the manifester to convert the emotion response message into the behavior message.

An agent uses current emotional state index that has predefined thresholds that are indicative of the emotions of neutrality, happiness, sadness and anger. The agent also uses a current confidence index, wherein the confidence level of the agent is represented as a numerical value. In addition, in a virtual environment, agents have to be aware of each other and be able to react to each other as dictated by the emotional states and personality traits. Therefore, the emotional state register of an agent can further comprise at least one or more of an agent interrelationship index, which is used for indicating the relationship between agents. The agent interrelationship index is used with another agent that receives an input event, with another agent that outputs an emotion response message or with an agent observes an input event or an emotion response message.

An additional refinement of the agents of the present invention is that the social response generator modifies the current state of the emotional state register based on the social event or the output from the predefined personality state register. For example, if an agent is in a virtual environment and the agent responds incorrectly to a particular social event (e.g., a school environment where a student agent gives an incorrect answer in response to a question from a professor agent), the emotional state register may be updated based on an output from the agent personality trait register, as well as the current emotion index in the emotional state register.

With respect to predefined personality trait register, the personality of an agent comprises at least one of an intelligence index, a conscientiousness index, an extraversion index, an agreeableness index and an emotional stability index. Since a human being's personality traits are fairly stable and do not generally change, the personality traits of an agent according to the present invention are predefined in a particular agent's programming and are not affected by the outputs from the social response generator or the emotion generator. The predefined personality trait register may also comprise an agent social status index. The agent social status index is used to define relationships between agents that receive an input event, agents that output an emotion response message and/or agents that observe a social event or an emotion response message. These indices are useful in establishing a social hierarchy between individual agents and/or groups of agents.

As indicated above, an agent comprises an event buffer for storing social response messages. In an embodiment of the present invention, the event buffer comprises a first buffer and a second buffer. The social response messages are sorted into the first and second buffers dependent upon the type of social response message that is output by the social response generator. For example, the social response generator generates an unexpected response index, which is stored in the first buffer. The social response generator also generates a danger response index that is stored in the second buffer. In addition, the social response generator generates a sensory input index, which is stored in the second buffer. In human beings, different responses to external events are active for differing lengths of time. When a person is surprised, that response only lasts a short time. When a person senses danger, however, that response/awareness will likely last until the person no longer perceives a dangerous situation. In the present invention, the differing time lengths for these types of responses are implemented with event buffers having different validity lengths. Specifically, a social response message that is stored in the first buffer is maintained for a predetermined first period of time, and a social response message that is stored in the second buffer is maintained for a predetermined second period of time. In the present invention, a social response message that is stored in the first buffer is maintained for a shorter period of time that a social response message stored in the second buffer.

After the social response generator has processed the social event and output a social response message (if dictated by the agent programming) and updated the emotional state register and/or the current emotion index (if dictated by the agent programming), the emotion generator creates and outputs an emotion response message. There are different emotion response messages, and the emotion response messages are output into emotion categories. As with the event buffer, the emotion categories have differing validity lengths. The generated emotion response messages are based on at least one or more outputs from the predefined personality trait register, one or more outputs from the emotional state register and/or the social response message stored in the event buffer.

The emotion categories comprise at least a lasting emotion category, a short-lived emotion category and a momentary emotion category. For the momentary emotion category, its validity length is determined by an unexpected response index generated by the social response generator. Accordingly, the emotion generator generates an emotion response message for the momentary emotion category that comprises at least a surprise indicator. For the short-lived emotion category, its validity length is determined by a danger response index or a sensory input response index generated by the social response generator. The emotion generator generates an emotion response message for the short-lived emotion category that comprises at least indices indicative of disgust or fear. Finally, the emotion generator generates an emotion response message for the lasting emotion category that comprises indices indicative of neutrality, happiness, sadness or anger.

The interpreter of the socially intelligent agent determines if an input event requires processing using information from at least one of the role database, the emotional state register and the predefined personality trait register. If the determination is positive, the interpreter creates the social event based on data input from at least one of the role database, the emotional state register and the predefined personality trait register and outputs the social event to the social response generator. If the determination is negative, the interpreter simply converts the input event into a social event message and outputs the social event message to the social response generator. After the social response generator has processed the social event message and updated at least one of the emotional state register and the event buffer, the social response generator signals the interpreter. This signal to the interpreter causes the interpreter to trigger the manifester to cause the emotion generator to generate and output the emotion response message. The manifester processes the emotion response message using data from the role database and outputs the behavior message.

In an alternative embodiment of the present invention, an article of manufacture, which comprises a computer readable medium having stored therein a computer program for an agent, is provided. The computer program comprises a first code portion that receives an input event and outputs a social event based on an interpretation of the input event and a second code portion that receives the social event, an output from an emotional state register and an output from a predefined personality trait register, and updates at least one of a current state of the emotional state register and a social response message stored an event buffer. The computer program further comprises a third code portion that outputs an emotion response message based on at least one of the social response message stored in the event buffer, one or more outputs of the predefined personality trait register, or one or more outputs of the emotional state register. The computer program product also comprises a fourth code portion that receives the emotion response message output from the emotion generator and converts the emotion response message into a behavior message. A fifth code portion comprises social characteristics used by the first code portion to create social events and data used by the fourth code portion to convert the emotion response message into the behavior message. This embodiment of the present invention includes all the features of the first embodiment described above with respect to the characteristics and operation of the first through fifth code portions, the emotional state register, the personal trait register, the event buffer, the emotion categories, etc.

In another alternative embodiment of the present invention, a software agent embodied in computer executable code for execution on a computer is provided. The software agent comprises an interpreter that receives an input event and outputs a social event based on the interpretation of the input event, and a social response generator that receives the social event, an output from an emotional state register and an output from a predefined personality trait register, and updates at least one of a current state of the emotional state register and a social response message stored an event buffer. The software agent also comprises an emotion generator that outputs an emotion response message based on at least one of the social response message stored in the event buffer, one or more outputs of the predefined personality trait register, or one or more outputs of the emotional state register, and a manifester that receives the emotion response message output from the emotion generator and converts the emotion response message into a behavior message. The software agent also comprises a role database comprising social characteristics used by the interpreter to create social events and data used by the manifester to convert the emotion response message into the behavior message. This embodiment of the present invention includes all the features of the first embodiment described above with respect to the characteristics and operation of the social response generator, the emotion generator, the interpreter, the manifester, the emotional state register, the personal trait register, the event buffer, the emotion categories, etc.

As discussed in the background section, agents need a virtual environment for operation. According to another embodiment of the present invention, such a virtual environment would be suitable for a plurality of agents as described above. Preferably, the scenario environment would comprise a scenario database, coupled to the scenario environment, for providing a cyberspace context that allows the plurality of agents to interact with each other. The scenario database would comprise a plurality of different cyberspace contexts, and would provide context that graphically depicts the interaction between the plurality of software agents based on behavior messages received from the plurality of software agents.

In another alternative embodiment, the present invention provides a method for generating emotional responses for a software agent. The method comprises receiving and interpreting an input event based on stored social characteristics and outputting a social event based on the interpretation of the input event. The method further comprises receiving the social event, an output from an emotional state register and an output from a predefined personality trait register, and updating at least one of a current state of the emotional state register and a social response message stored an event buffer. An emotion response message based on at least one of the social response message stored in the event buffer, one or more outputs of the predefined personality trait register, or one or more outputs of the emotional state register is output. The emotion response message that is output from the emotion generator is converted into a behavior message based on stored social characteristics.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

FIG. 7 depicts a realization of the personality trait register and the emotional state register according to an exemplary embodiment of the present invention.

FIG. 8 is a pseudo-code realization of a feedback task executed by a socially intelligent agent according to an exemplary embodiment of the present invention.

FIG. 9 is a pseudo-code realization of a task request executed by a socially intelligent agent according to an exemplary embodiment of the present invention.

FIG. 10 is a pseudo-code realization of a social feedback task executed by a socially intelligent agent according to an exemplary embodiment of the present invention.

FIG. 11 is a pseudo-code realization of an unexpected event task executed by a socially intelligent agent according to an exemplary embodiment of the present invention.

FIG. 12 is a pseudo-code realization of a sensory input task executed by a socially intelligent agent according to an exemplary embodiment of the present invention.

FIG. 13 is a pseudo-code realization of a task that clears a sensory input index executed by a socially intelligent agent according to an exemplary embodiment of the present invention.

FIG. 14 is a pseudo-code realization of a danger response task executed by a socially intelligent agent according to an exemplary embodiment of the present invention.

FIG. 15 is a pseudo-code realization of a task that clears a danger response executed by a socially intelligent agent according to an exemplary embodiment of the present invention.

FIG. 16 is a pseudo-code realization of an emotions generation task executed by a socially intelligent agent according to an exemplary embodiment of the present invention.

FIGS. 17-19 are pseudo-code realizations of interpreter tasks executed by a socially intelligent agent according to an exemplary embodiment of the present invention.

FIG. 20 is a pseudo-code realization of a manifester task executed by a socially intelligent agent according to an exemplary embodiment of the present invention.

FIG. 21-23 is a pseudo-code realization of an interpreter task executed by a socially intelligent agent according to an exemplary embodiment of the present invention.

FIG. 24 are pseudo-code realizations of manifester tasks executed by a socially intelligent agent according to an exemplary embodiment of the present invention.

DESCRIPTION OF THE INVENTION

Hereinafter, an illustrative, non-limiting embodiment of the present invention will be described in detail with reference to the accompanying drawings. Within the context of the description that follows, the terms “agent,” “software agent,” “socially intelligent agent” refer to a virtual entity that responds to commands created by the scenario that is executing within cyberspace context (i.e., a co-learning scenario executing in a cyberspace context) or in response to messages output by other agents or avatars. An “avatar” refers to a virtual entity that is operating in the cyberspace context, but is under direct control of a user. Although an agent and an avatar have different control mechanisms, they both can incorporate the social response mechanisms described herein below for controlling their emotional expressions and responses. Within the context of this disclosure and claims, the terms “avatar” and “agent” are used as synonyms by using either term to refer to both avatars and agents.

Figure 1:
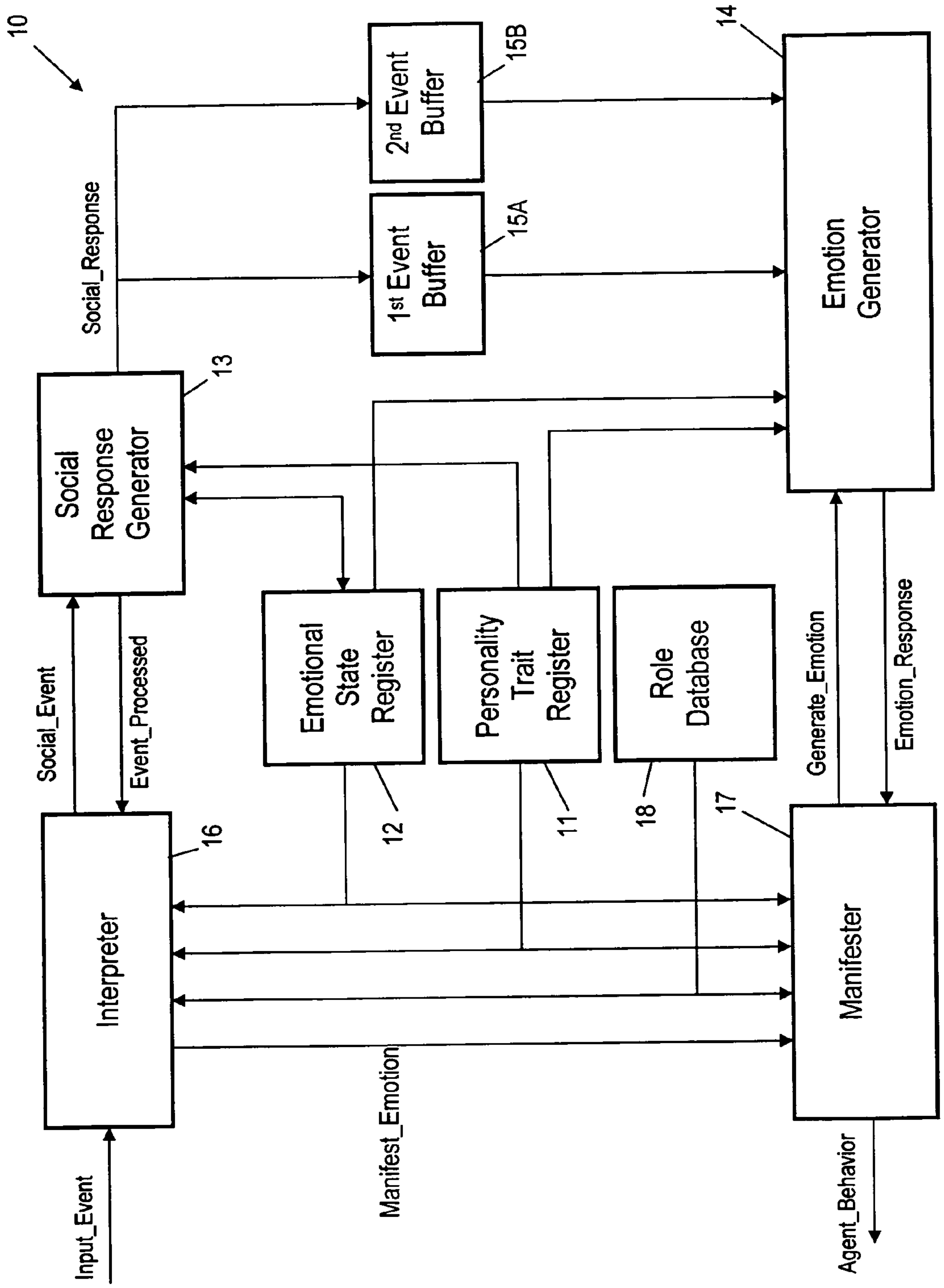
FIG. 1 is a diagram of a socially intelligent agent according to an exemplary embodiment of the present invention.

Referring to FIG. 1, in an embodiment of the present invention, a socially intelligent agent 10 comprises a social response generator 13 coupled to an emotion generator 14. The social response generator 13 receives and processes a Social_Event message. The social response generator 13 processes the Social_Event message according to a plurality of predefined personality trait indices stored in a personality trait register 11 and a plurality of emotional state indices stored in an emotional state register 12. The personality trait register 11 and the emotional state register 12 are not global in nature, in that only the socially intelligent agent 10 associated with those registers can access them. Subsequent to the processing of the Social_Event message, the social response generator 13 outputs at least one Social_Response message based on the predefined personality trait indices that is output from the predefined personality trait register 11 and the emotional state index 41 output from the emotional state register 12. Depending on its context, the Social_Response message is output to a first event buffer 15A or a second event buffer 15B. The emotion generator 14 captures the Social_Response message from the event buffers 15A, 15B, and outputs an Emotion_Response message. The emotion generator 14 creates the Emotion_Response message based on at least one of a personality trait index that is output from the predefined personality trait register 11, the emotional state index 41 that is output from the emotional state register 12 and/or the plurality of emotional state indices.

The socially intelligent agent 10 further comprises an interpreter 16, which receives an Input_Event message. The cyberspace context that the socially intelligent agent 10 is operating within generates an application dependent task event according to cyberspace context and sends the application dependent task event to all the socially intelligent agents attached to the context. For example, in a cyberspace context involving a plurality of socially intelligent agents as students and an additional socially intelligent agent acting as a professor, a typical application dependent task event might be PROFESSOR_CALL_STUDENT, which is sent to all the socially intelligent agents. When the interpreter 16 receives an application dependent task event as an Input_Event message, the application dependent task event is processed based on information from the emotional state register 12, the personality trait register 11 and a role database 18, which contains social characteristic information. Alternatively, the interpreter 16 forwards the Input_Event message to the social response generator 13 as a Social_Event message without any further processing using information from the emotional state register 12, the personality trait register 11 and a role database 18. After the social response generator 13 has processed the Social_Event message received from the interpreter 16, the social response generator 13 sends an Event_Processed flag to the interpreter 16.

The socially intelligent agent 10 further comprises a manifester 17 that coordinates the manifestation of the socially intelligent agent's emotional response to the Social_Event message. After receiving the Event_Processed flag from the social response generator 13, the interpreter 16 outputs a Manifest_Emotion flag to the manifester 17 to begin the process of manifesting the socially intelligent agent's emotional response. Based on the social characteristics in the role database 18, the manifester 17 sends a Generate_Emotion flag to the emotion generator 14. The emotion generator 14 uses information from the emotional state register 12, the personality register 11 and the event buffers 15A, 15B to generate the socially intelligent agent's emotional response (if one is required) to the Social_Event message. It might be, based on the social characteristics in the role database 18, that no emotional response is required and the manifester 17 does not issue a Generate_Emotion flag to the emotion generator 14. If the manifester 17 issues a Generate_Emotion flag, the emotion generator 14 outputs an Emotion_Response message to the manifester 17 based on information from the emotional state register 12, the personality register 11 and the event buffers 15A, 15B. The manifester 17 uses the Emotion_Response message, plus information from the emotional state register 12, the personality register 11 and the role database 18 to formulate an Agent_Behavior message that is indicative of the socially intelligent agent's response to a Social_Event message.

Figure 2:
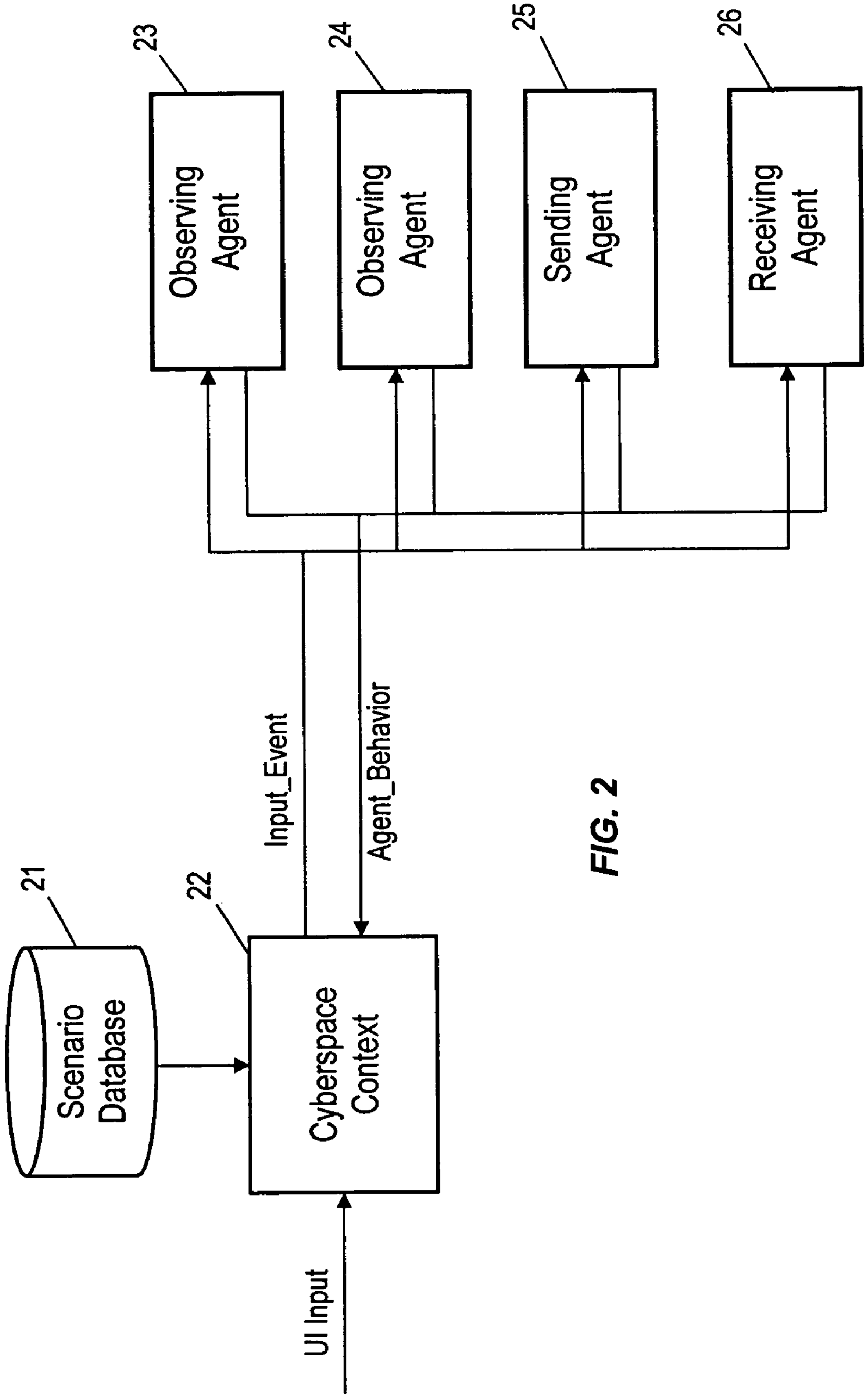
FIG. 2 is a diagram of a plurality of socially intelligent agents coupled to a cyberspace context and a scenario database according to an exemplary embodiment of the present invention.

Referring to FIG. 2, a typical cyberspace context with multiple socially intelligent agents is illustrated. The socially intelligent agent 25 is the sending agent of an Agent_Behavior message that is processed by the cyberspace context 22. The socially intelligent agent 26 is an agent that is the recipient of an Input_Event message from the cyberspace context 22. The socially intelligent agents 23, 24 are observing agents, in that their social responses are based on the Input_Event messages or Agent_Behavior messages that are sent to all agents, but are not specifically targeted to them, i.e., agents 23, 24. The cyberspace context 22 is coupled to a scenario database 21, which sends information that forms the cyberspace context. For example, if the cyberspace context 22 was a university classroom for a biology class, the scenario database 21 might contain a lecture on bacteria, which is then followed by a quiz of the "students" (i.e., socially intelligent agents) attending the lecture.

Figure 3A:
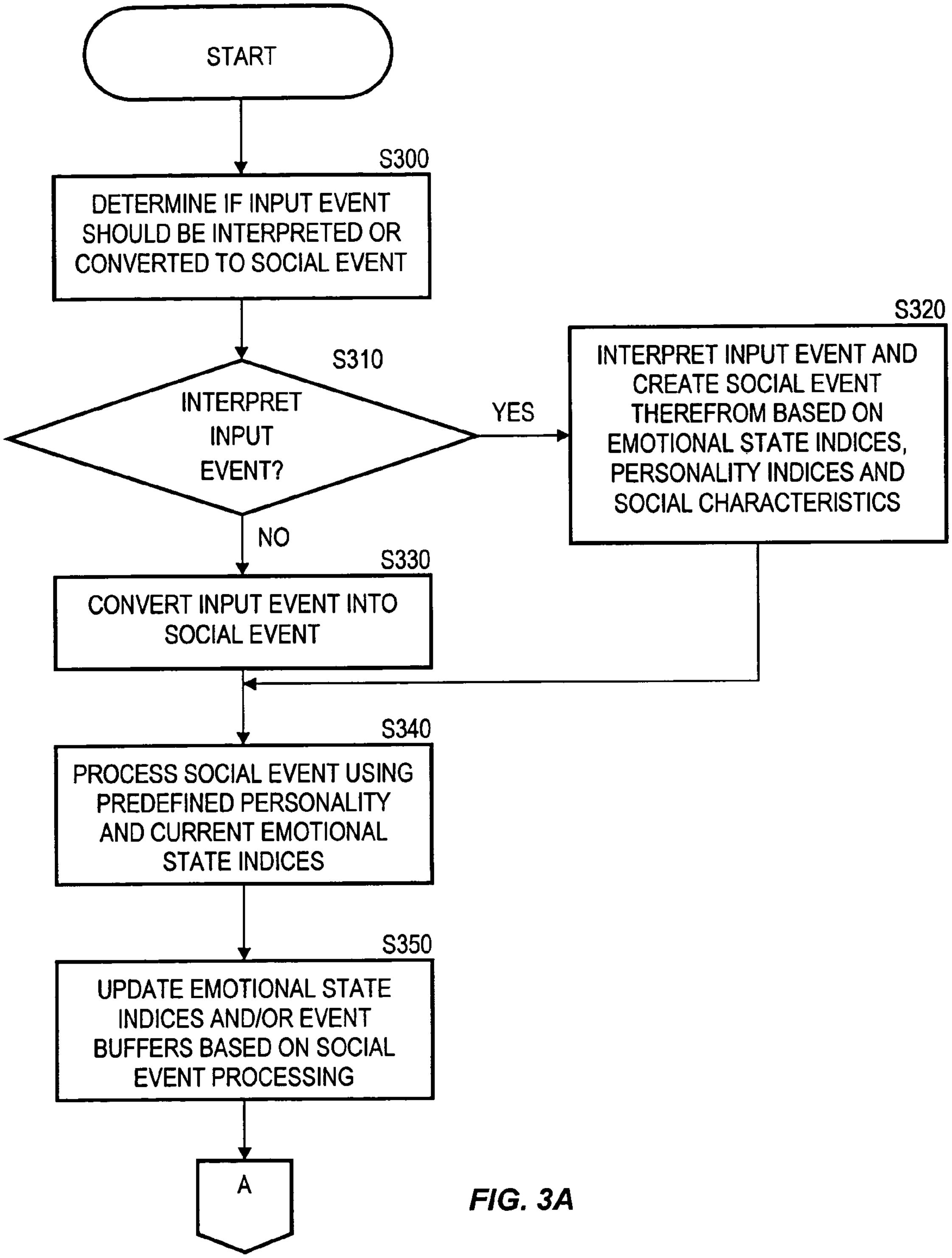
FIGS. 3A and 3B are flowcharts of the operation of the socially intelligent agent according to an exemplary embodiment of the present invention.
Figure 3B:
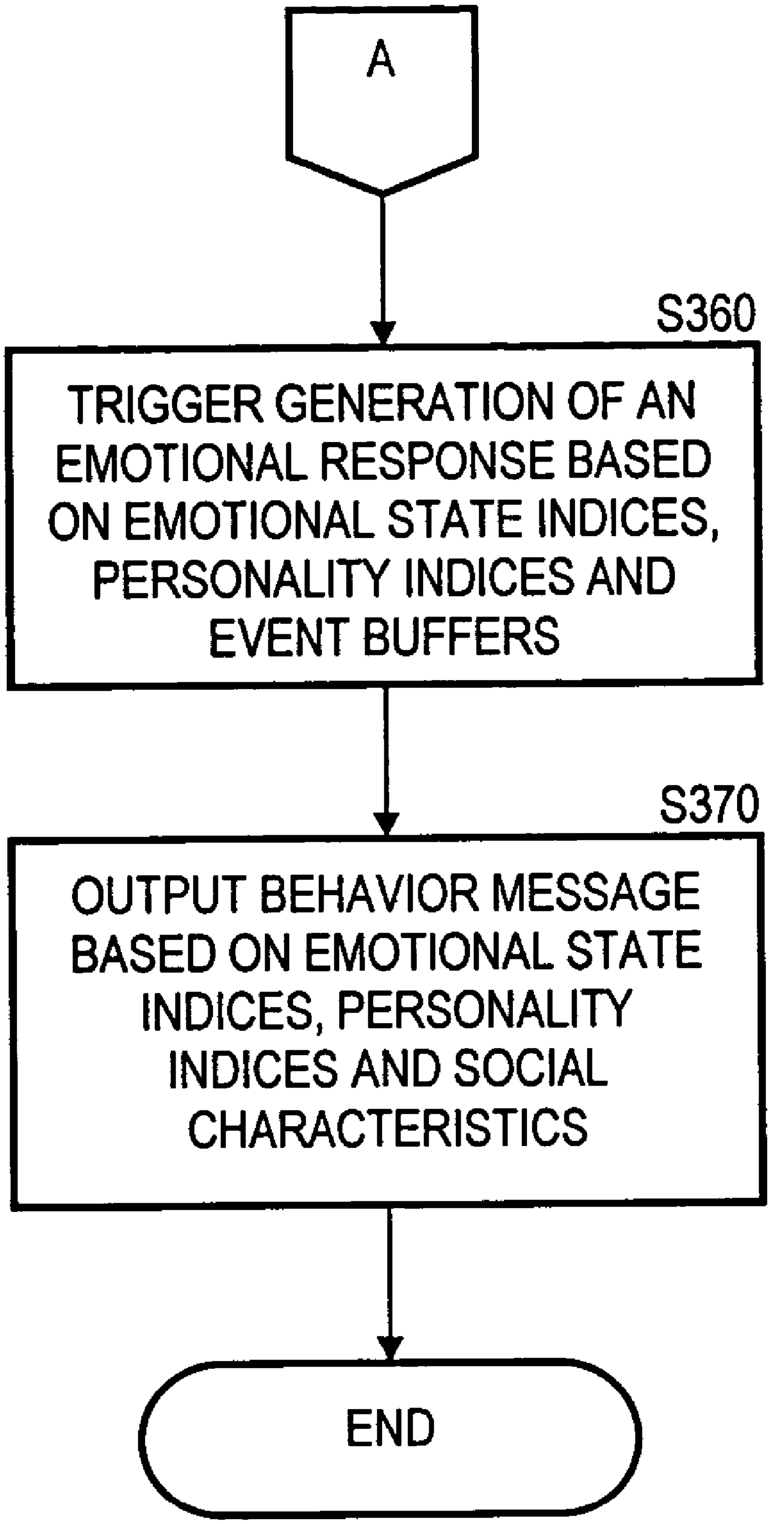

Referring to FIGS. 3A-3B, a flowchart illustrating the process flow within a socially intelligent agent is illustrated. At S300, a determination is made whether an Input_Event message should be interpreted using information from the emotional state indices, the personality trait indices and social characteristics, or should be converted into a Social_Event message. If the determination is positive, then, at S320, the Input_Event message is interpreted using emotional state information, personality traits and social characteristics. As shown in FIG. 1, this information would reside in the emotional state register 12, the personality trait register 11 and the role database 18, respectively. If the determination is negative, then, as S330, the Input_Event message is converted into a Social_Event message without any interpretation using the emotional state indices, the personality trait indices and social characteristics. At S340, the Social_Event message is processed using the emotional state indices and the personality trait indices. Again, as shown in FIG. 1, this information would reside in the emotional state register 12 and the personality trait register 11. At S350, after the Social_Event message has been processed, the emotional state indices are updated, along with the event buffers, if necessary. The event buffers are the first and second event buffers illustrated in FIG. 1. Subsequent to the updating of the emotional state indices and the event buffers, at S360, the generation of an Emotion_Response message is triggered based on the emotional state indices, the personality trait indices and the event buffers. Following the generation of the Emotion_Response message, at S370, a behavior message is output based on the emotional state indices, the personality trait indices and the stored social characteristics.

In the context of the socially intelligent agent 10, states are variable information that each agent has at initialization. For example, states include the emotions of a socially intelligent agent. An emotional state is given to a socially intelligent agent at initialization, and updated according to social rules that are used for the generation of behavior of the socially intelligent agent 10.

Figure 4:
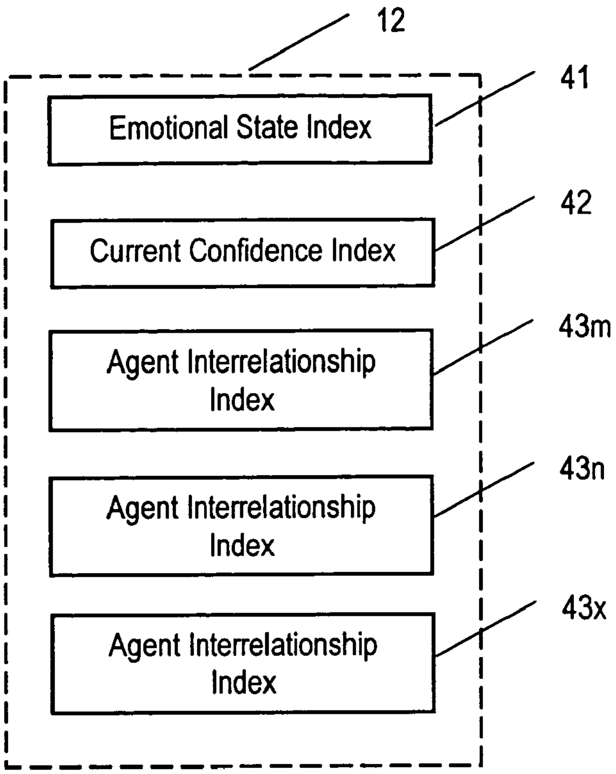
FIG. 4 is an emotional state register according to an exemplary embodiment of the present invention.

Referring to FIG. 4, a socially intelligent agent 10 uses a current emotional state index 41, wherein predefined thresholds are indicative of neutrality, happiness, sadness and anger. When a socially intelligent agent 10 is instantiated, the initialization process sets the emotional state index 41 to a predefined value. For example, if initial emotional state of the socially intelligent agent is one of neutrality, the emotional state index 41 is set to 0.0. While the socially intelligent agent is active, the emotional state index 41 will range between a maximum and minimum values. For the exemplary embodiment, the emotional state index 41 will contain a real number ranging from −1.0 to 1.0. In the exemplary embodiment, as the emotional state index 41 becomes more positive, i.e., closer to 1.0, the emotional state of the socially intelligent agent 10 will become one of happiness. Conversely, as the emotional state index 41 becomes more negative, i.e., closer to −1.0, the emotion state of the socially intelligent agent 10 degrades into sadness and thence into anger. Of course, within the range of 0.0 to 1.0, there are various thresholds of happiness. For an embodiment of the emotional state index 41, TABLE 1 illustrates the range of possible emotions for the socially intelligent agent 10 and how various thresholds within the emotional state index 41 are associated with the possible emotions.

TABLE 1

| Index Range | Agent Emotional State |
|---|---|
| 0.75 to 1.0 | Extremely Happy |
| 0.41 to 0.7 | Happy |
| 0.11 to 0.4 | Slightly Happy |
| −0.1 to 0.1 | Neutral |
| −0.25 to −0.11 | Slightly Sad/Slightly Angry |
| −0.75 to −0.26 | Sad/Angry |
| −1.0 to −0.76 | Extremely Sad/Extremely Angry |

The ranges illustrated in TABLE 1 are exemplary in nature and can be adapted/changed to suit a particular type of socially intelligent agent. For the negative emotions, TABLE 1 illustrates that a particular range of emotional state index 41 is interpreted for both sadness and anger. For example, if the emotional state index 41 contains a value in the range of −0.25 to −0.11, the emotional state of the socially intelligent agent can be interpreted as slightly sad or slightly angry. The dual interpretations are based on the indices of the predefined personality trait register 11 (See FIG. 6) and will be explained in more detail during the discussion of the emotion generator.

A. Bandura (See Self-efficacy (1994) (V. S. Ramachaudran (Ed.), *Encyclopedia of human behavior* (Vol. 4, pp. 71-81), New York: Academic Press (Reprinted in H. Friedman [Ed.], *Encyclopedia of mental health*, San Diego: Academic Press, 1998))) describes self-efficacy (i.e., confidence) as a fundamental psychological construct, defining it as "people's beliefs about their capabilities to produce designated levels of performance that exercise influence over events that affect their lives." Bandura further explains that perceived self-efficacy exerts influence over the character of emotion experienced when encountering a task. For example, if a person has a low confidence level when encountering a task, that person may become nervous or afraid. This concept fits well within the framework of appraisal theories of emotion discussed earlier. Bandura further discloses that a person boosts their self-confidence by successfully accomplishing tasks. Conversely, failing to accomplish tasks lowers a person's confidence level.

In an embodiment of the present invention, the socially intelligent agent 10 uses a current confidence index 42, wherein the confidence level of the agent is represented as an integer value. For a socially intelligent agent 10 having a neutral confidence state, the current confidence index 42 will be approximately 0.0. If the current confidence index 42 exceeds a predefined threshold (e.g., 0.45), the socially intelligent agent 10 will exhibit confident behavior. For example, a socially intelligent agent 10 having a high positive value in its current confidence index 42 may comment on the current relationship between other agents, or will comment on the behavior of another socially intelligent agent or will act in an assured manner with socially intelligent agents in the context of a virtual environment. Conversely, a socially intelligent agent 10 having a high negative value in its current confidence index 42 (i.e., −0.63) that exceeds a predefined threshold will manifest unconfident behavior. As with the emotional state index 41, the thresholds of the current confidence index 42 can be manipulated based on the type of the socially intelligent agent that is desired.

In addition, in a virtual environment, socially intelligent agents have to be aware of each other and be able to react to each other as dictated by the emotional states and personality traits. Therefore, the emotional state register 12 of a socially intelligent agent 10 can further comprise at least one or more of an agent interrelationship index 43*m*, 43*n*, 43*x* for another agent that receives a Social_Event message and/or that outputs an Emotion_Response message. Depending upon the complexity of the social context within a given virtual environment, a socially intelligent agent 10 may comprise one or more agent interrelationship indices in various combinations. For example, if a particular virtual environment is supporting four socially intelligent agents (AGENT1, AGENT2, AGENT3 and AGENT4), each of the agents will have multiple agent interrelationship indices. For example, AGENT1 will have an agent interrelationship index(AGENT2) directed towards AGENT2, an agent interrelationship index (AGENT3) directed towards AGENT3 and an agent interrelationship index(AGENT4) directed towards AGENT4. Of course, the agent interrelationship index 43 can be implemented as individual registers or memory locations, or as an array with an identifier of a particular socially intelligent agent acting as the index into the array. The social response generator 13 can call on these various indices as its programming warrants.

A discussion of the values used in the various interrelationship indices and how they indicate relationships between socially intelligent agents follows. AGENT1 has a neutral relationship with AGENT2, i.e., the agent interrelationship index of AGENT1 for AGENT2 is approximately 0.0. This value is the default value for the agent interrelationship index 43 between two socially intelligent agents. If the AGENT1/AGENT2 interrelationship index becomes more positive, it means that AGENT1 likes AGENT2 and the absolute value of this value represent how much AGENT1 likes AGENT2. In addition, AGENT1 has an unpleasant relationship with AGENT3, i.e., the AGENT1/AGENT3 interrelationship index is less than 0.0. If the AGENT1/AGENT3 interrelationship index becomes more negative, it means AGENT1 dislikes AGENT3, and the absolute value of the AGENT1/AGENT3 interrelationship index represents how AGENT1 dislikes AGENT3. Of course, AGENT2, AGENT3 and AGENT4 each have their own interrelationship indices with AGENT1, as well as each other.

Figure 5:
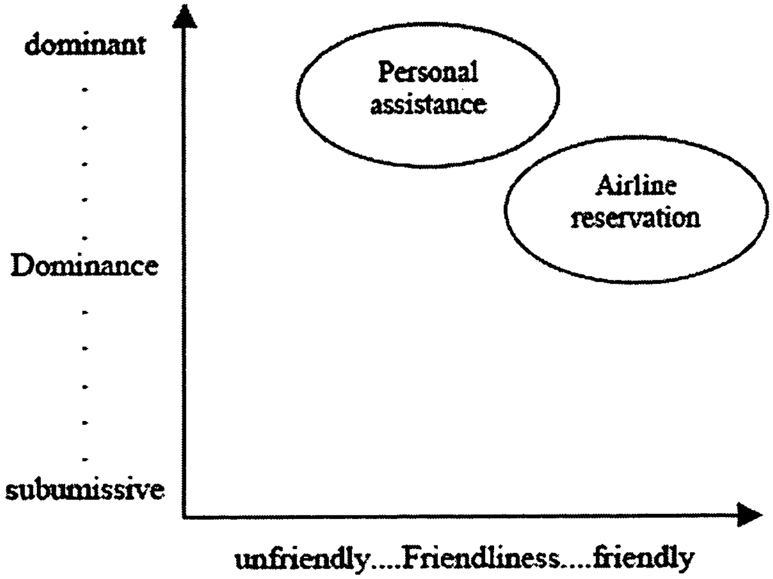
FIG. 5 is a dominance/friendliness diagram used for establishing personality traits.

Human beings naturally recognize and respond to the personalities of other individuals. Since an individual's personality is one of their more consistent mental aspects, it is typically used as a predictive indicator of the emotional state and possible behaviors of an individual. Although an individual's personality does not radically transform within a short time intervals, prolonged exposure to a particular environment can induce some change. In the realm of psychology, five indicia are known to characterize some of the major attributes of personality. See D. Moffat, *Personality Parameters and Programs, Creating Personalities for Synthetic Actors*, Springer (1997). The indicia are openness/intellect, conscientiousness, extraversion, agreeableness and emotional stability. Reeves and Nass claim that friendliness and dominance are two major attributes of personality, especially that of mediated agents. See B. Reeves, and C. Nass, *The Media Equation: How People Treat Computers, Television, and New Media Like Real People and Places*, CSLI Publications and Cambridge University Press, New York, 1996. FIG. 5 depicts a two-dimensional personality space that demonstrates the interrelationship between friendliness and dominance. The personality traits for a personal assistant agent should preferably be dominant and does not need to be overly friendly. For a service type agent, the personality should be friendly and not so dominant so the service agent will be more compliant to the customer's requests. This personality mapping technique is very useful to reduce a potentially large number of design parameters such as rules for selecting action, rules for facial expression, etc.

Figure 6:
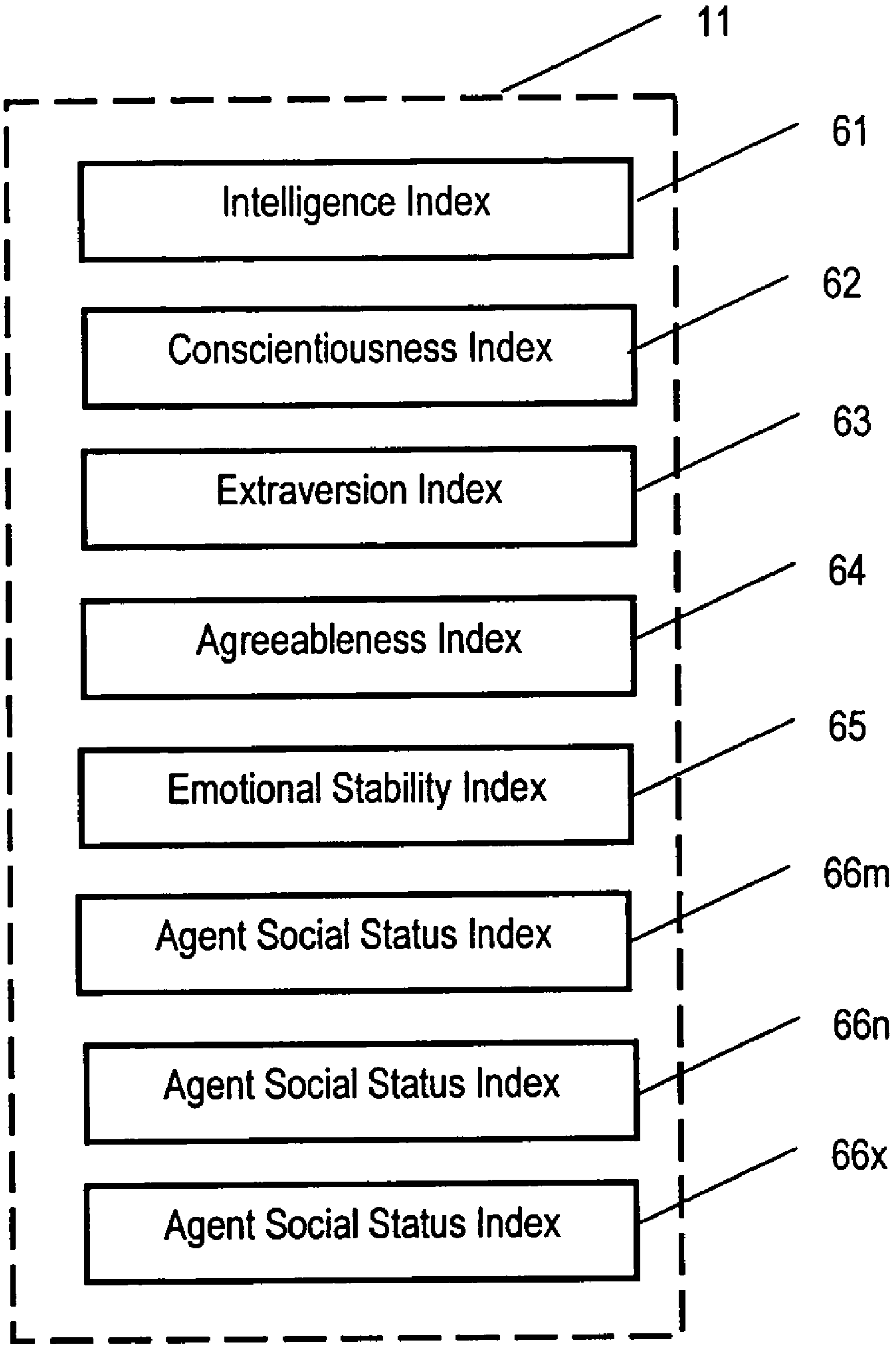
FIG. 6 is a diagram of a personality trait register according to an exemplary embodiment of the present invention.

In the context of the present invention, traits are static information that does not change during a session in a virtual environment. For a socially intelligent agent 10, traits include personality and social status. Referring to FIG. 6, with respect to predefined personality trait register 11, the socially intelligent agent 10 comprises one or more of an intelligence index 61, a conscientiousness index 62, an extraversion index 63, an agreeableness index 64 and an emotional stability index 65. As noted above, in the short term, a human being's personality traits are fairly stable and do not generally change. Thus, the personality traits of a socially intelligent agent 10 according to the present invention are predefined in a particular agent's programming and are not affected by the outputs from the social response generator 13 or the emotion generator 14.

The predefined personality trait register 11 will now be described in greater detail. The intelligence index 61 represents the degree of openness to experience and/or intellect of the socially intelligent agent 10. In the exemplary embodiment, the intelligence index 61 ranges from 0.0 to 1.0. An average socially intelligent agent 10 will have an intelligence index 61 of approximately 0.5. If the intelligence index 61 is greater than 0.5, the socially intelligent agent 10 will be imaginative, curious, creative, adventurous, original, artistic, etc. Conversely, if the intelligence index 61 is less than 0.5, the socially intelligent agent 10 will act in a conventional manner, will avoid the unfamiliar, will be inartistic, will lack imagination, etc.

The conscientiousness index 62 represents the degree of conscientiousness of a socially intelligent agent. In the exemplary embodiment, the conscientiousness index 62 ranges from 0.0 to 1.0. An average socially intelligent agent 10 will have a conscientiousness index 62 of approximately 0.5. If the conscientiousness index 62 is greater than 0.5, a socially intelligent agent will be cautious, disciplined, organized, neat, ambitious, goal-oriented, etc. On the other hand, if the conscientiousness index 62 is less than 0.5, a socially intelligent agent will be unreliable, lazy, careless, negligent, low on need for achievement, etc.

The extraversion index 63 represents the degree of extraversion of a socially intelligent agent. In the exemplary embodiment, the extraversion index 63 ranges from 0.0 to 1.0. An average socially intelligent agent 10 will have an extraversion index 63 of approximately 0.5. If the extraversion index 63 is greater than 0.5, a socially intelligent agent will be talkative, optimistic, sociable, friendly, high in need for stimulation, etc. Conversely, if the extraversion index 63 is less than 0.5, a socially intelligent agent will be quiet, conventional, less assertive, aloof, etc.

The agreeableness index 64 represents the degree of agreeableness of a socially intelligent agent. In the exemplary embodiment, the agreeableness index 64 ranges from 0.0 to 1.0. An average socially intelligent agent 10 will have an agreeableness index 64 of approximately 0.5. If the agreeableness index 64 is greater than 0.5, a socially intelligent agent will be compassionate, caring, good-natured, trusting, cooperative, helpful, etc. On the other hand, if the agreeableness index 64 is less than 0.5, a socially intelligent agent will be irritable, rude, competitive, unsympathetic, self-centered, etc.

The emotional stability index 65 represents the degree of neuroticism and/or emotional stability of a socially intelligent agent. In the exemplary embodiment, the agreeableness index 64 ranges from 0.0 to 1.0. An average socially intelligent agent 10 will have an emotional stability index 65 of approximately 0.5. If the emotional stability index 65 is greater than 0.5, a socially intelligent agent will be relaxed, calm, secure, unemotional, even-tempered, etc. Conversely, if the emotional stability index 65 is less than 0.5, a socially intelligent agent will be anxious, nervous, worrying, insecure, emotional, etc.

The predefined personality trait register 11 may also comprise an agent social status index 66*m*, 66*n*, 66*x*. These indices are useful in establishing a social hierarchy between individual agents and/or groups of agents. In the exemplary embodiment, the agent social status index 66*m*, 66*n*, 66*x* is an integer value that is greater than zero. Each socially intelligent agent will have its own social status index, and each socially intelligent agent can refer to the social status index of other socially intelligent agents. For example, if a socially intelligent AGENT1 wants to refer the social status of socially intelligent AGENT2, AGENT1 can refer to the social status index of AGENT2, i.e., agent social status index(AGENT2). Depending upon the complexity of the social context within a given virtual environment, a socially intelligent agent 10 may comprise one or more agent social status indices in various combinations. Of course, the agent social status index 66 can be implemented as individual registers or memory locations, or as an array with an identifier of a particular socially intelligent agent acting as the index into the array. The social response generator 13 can call on these various indices as its programming warrants.

Referring to FIG. 7, an exemplary embodiment of the emotional state register 12 and the predefined personality trait register 11 is illustrated. In this particular exemplary embodiment, the five personality traits, the social status, the emotional state, the confidence level and the interrelationship index for AGENT1 is shown. In addition, the social status index and the interrelationship index for AGENT2 and AGENT3 are shown as well in this exemplary embodiment, which indicates that the socially intelligent agent AGENT1 has a relationship with other socially intelligent agents AGENT2 and AGENT3 and a hierarchy among the socially intelligent agents is present.

An additional refinement of the agents of the present invention is that the social response generator 13 modifies the current state of the emotional state register 12 based on the Social_Event message or the output from the predefined personality trait register 11. For example, if a socially intelligent agent 10 is in a virtual environment and the agent responds incorrectly to a particular Social_Event message (e.g., a school environment where the agent gives an incorrect answer in response to a question from a professor agent), the emotional state register 12 may be updated based on an output from the agent personality trait register 11, as well as the emotional state index 41 in the emotional state register 12.

Referring to FIG. 9, an exemplary implementation of a function of the social response generator 13 is illustrated. The Task_Request function processes a Social_Event message related to a task request. When one socially intelligent agent makes a task request to another socially intelligent agent, the Task_Request function is called. All socially intelligent agents operating within a particular cyberspace context receive the Task_Request, so the Task_Request function first determines if a particular socially intelligent agent is the intended receiver of a Social_Event message. If so, the Task_Request function will update the emotional state index 41 of the agent using the emotional stability index 65, the conscientiousness index 62, the current confidence index 42 and the social status of the sending agent as well as the social status of the receiving agent. In addition, a parameter of the Task_Request function is an objective probability of success. The objective probability of success parameter is set by the cyberspace context in which the socially intelligent agent is operating. For example, if the objective probability of success parameter is a low real number (ie., 0.2), then that is an indication that the requested task is difficult. Conversely, if the objective probability of success parameter is a high real number (i.e., 0.89), then the requested task is simple.

Referring to FIG. 8, an exemplary implementation of another function of the social response generator 13 is illustrated. The Task_Feedback function is defined as a part of social rule, and represents how to process a Social_Event message that is related to feedback for some tasks. When a socially intelligent agent 10 has to give feedback for certain tasks towards another socially intelligent agent, the Task_Feedback function is called.

In the exemplary embodiment, the Task_Feedback function is divided into three sub-functions that are executed based on how the Social_Event message is directed to the socially intelligent agent 10. Specifically, if the socially intelligent agent 10 is the receiver of the Social_Event message, then the first and third of the three sub-functions is executed. If the socially intelligent agent 10 is the sender of the Social_Event message or is observing the Social_Event message (observing in this context means that one socially intelligent agent is aware that another socially intelligent agent is sending/receiving the Social_Event message, but the observing socially intelligent agent neither receives or sends the Input_Event), then the second and third of the three sub-functions is executed.

If a socially intelligent agent is receiving a Social_Event message, the first and third sub-functions of the Task_Feedback function are executed. The Task_Feedback function includes three input parameters: the identifier of the agent that sent the task (sender), the identifier of the agent that is receiving the task (receiver), and the degree of the task (degree). The degree parameter is indicia of the strength of the behavior, and is related to the objective probability of success parameter of the Task_Request function. If a socially intelligent agent has achieved a task, then the degree parameter will be set to a positive real number (i.e., 1.0). Conversely, if a socially intelligent agent has failed to achieve a task, then the degree parameter will be set to a negative real number (i.e., −1.0). The sub-function of the Task_Feedback function first executes the processes for the event buffer 15 for storing Social_Response messages. In the exemplary embodiment, if the agent's current confidence index 42 is above a predefined threshold (i.e., Threshold-1) and the degree of behavior is greater than zero, the function Unexpected_Event is called to store an unexpected event indication in the event buffer 15. If the agent's current confidence index 42 is below a predefined threshold (i.e., Threshold-2) and the degree of behavior is less than zero, the function Unexpected_Event is called to store an unexpected event indication in the event buffer 15. The Threshold-1 and Threshold-2 factors can be manipulated to fine-tune the social responses of the socially intelligent agent.

After determining whether to set an unexpected event indication, the first sub-function then updates the emotional state index 41, the current confidence index 42 and the agent interrelationship index 43. First, the sub-function calculates an emotion delta (i.e., delta-emotion in FIG. 8) that is based on the emotional stability index 65, the conscientiousness index 62, the social status index 66 of both the sending agent and the receiving agent, and the degree of behavior. As shown in FIG. 8, the emotional state index 41 (i.e., state-emotion in FIG. 8) is revised based on the current value of the emotional state index 41 and the emotion delta. Next, as shown in FIG. 8, The interrelationship index 43 for the agent that is the sender of the task (e.g., state-liking-for(sender)) is updated as well using the emotion delta value and the current value of the agent interrelationship index 43. Finally, as shown in FIG. 8, the current confidence index 42 is updated using the emotion delta, the current value of the current confidence index 42, the extraversion index 63, the degree of behavior and weighting factors (e.g., Weight-1 and Weight-2). The Weight-1 and Weight-2 weighting factors can be manipulated to fine tune the social responses of the socially intelligent agent.

The Task_Feedback function uses several sub-functions to accomplish its desired results. In the exemplary embodiment, since several of the personality trait indices and the emotional indices are restricted to values in the range of −1.0 to 1.0, the capAt1 function range limits the calculations performed by the Task_Feedback function. For example, capAt1(0.3) would returns 0.3, capAt1(1.3) would return 1.0 and capAt1(−1.6) would return −1.0. The sub-function setDesiredBehavior(x, y, z) sets an index for doing behavior identified by parameter x towards another socially intelligent agent identified by y with degree of behavior z. For example, the function call "setDesiredBehavior (Social_Feedback, AGENT3, 0.5)" means gives social feedback towards an agent with the identifier AGENT3 with degree of behavior equal to 0.5.

The second sub-function of the Task_Feedback function is called if the socially intelligent agent 10 has sent the Social_Event message or is observing the Social_Event message. The emotional state index 41 and the current confidence index of the agent are updated in a similar manner as discussed above with respect to an agent that receives a Social_Event message, although the formulas used are different.

The third sub-function of the Task_Feedback function is always called. The emotional state index 41, the various social status indices and the interrelationship index for the agent receiving the Social_Event message are examined. In the exemplary embodiment, different combinations of the emotional state index 41 and the agent social status index 66 of the sending/observing agent, and the interrelationship index 43 and agent social status index 66 of the receiving agent are examined, and based on their results, the sub-function setDesiredBehavior(x, y, z) is called to set an index for a behavior directed to a particular agent. Depending upon the values of the various indices, the giving of social feedback in response to a Social_Event message may or may not occur. The invocation of setDesiredBehavior(null, null, null)" clears the buffer for storing the index related to behavior.

Referring to FIG. 10, an exemplary implementation of another of the functions of the social response generator 13 is illustrated. The Social_Feedback function was referred to earlier in FIG. 8 and was invoked in the context of social feedback. If a socially intelligent agent is to provide social feedback based on emotional and personality indices, then the Social_Feedback function is called. If an agent that received a Social_Event message is invoking the Social_Feedback function, an emotion delta (e.g., delta-emotion in FIG. 8) is calculated using the emotional stability index 65, the extraversion index 63 and the degree of behavior parameter that is input in the Social_Feedback function. As shown in FIG. 8, the emotion delta is used to update the emotional state index 41 and the interrelationship index 43 for the sender of the Social_Event message. If an agent that observed a Social_Event message is calling the Social_Feedback function, then the interrelationship index 43 of the agent that sent the Social_Event message is updated using the degree of behavior.

As indicated above, a socially intelligent agent 10 comprises an event buffer 15 for storing Social_Response messages. In an embodiment of the present invention, the event buffer 15 comprises a first buffer 15A and a second buffer 15B. The Social_Response messages are sorted into the first and second buffer dependent upon the type of Social_Response message that is output by the social response generator 13. For example, the social response generator 13 generates an unexpected response index, which is stored in the first buffer 15A. The social response generator 13 also generates a danger response index that is stored in the second buffer 15B. In addition, the social response generator 13 generates a sensory input index, which is stored in the second buffer 15B. In human beings, different responses to external events are active for differing lengths of time. When a person is surprised, that response only lasts a short time. When a person senses danger, however, that response/awareness will likely last until the person no longer feels a sense of danger. In the present invention, the differing time lengths for these types of responses are implements with event buffers 15A, 15B having different validity lengths. Specifically, a Social_Response message that is stored in the first buffer 15A is maintained for a predetermined first period of time, and a Social_Response message that is stored in the second buffer 15B is maintained for a predetermined second period of time. In the present invention, a Social_Response message that is stored in the first buffer 15A is maintained for a shorter period of time that a Social_Response message stored in the second buffer 15B.

Referring to FIG. 11, an exemplary embodiment of a function used by the social response generator to set the unexpected response index is illustrated. The Unexpected_Event function first determines if an agent calling this function is an agent that received a Social_Event message. If so, the Unexpected_Event function checks the first buffer 15A to determine if an unexpected response index is present. The value returned from this interrogation is then compared to the value of the new unexpected response index. If the weight of the new unexpected response index is greater than the one currently stored in the first buffer 15A, the new unexpected response index will be stored in the first buffer 15A, and the value will set based on the degree of behavior. As noted above, if a socially intelligent agent was the receiver of a Social_Event and depending upon the current confidence index 42, the Unexepcted_Event function might be called.

Referring to FIGS. 12 and 13, exemplary functions that support the processing of a Social_Event message that is related to sensory input are illustrated. As shown in FIG. 12, the Sensory_Input function determines if the agent calling the function was the receiving agent of a Social_Event message. If the agent received a Social_Event message, then the weight of the new sensory input index is compared to the weight of the event currently buffered in the second event buffer 15B. In the exemplary embodiment, only the sensory input index and the danger response index will be stored in the second event buffer 15B. The weights of the sensory input index and the danger response index are predefined and the weight of danger response index is bigger than that of the sensory input index. This means that a later-occurring sensory input index will overwrite a sensory input index stored in the second event buffer 15B, but the later-occurring sensory input index cannot overwrite danger response index stored in there. FIG. 13 illustrates an exemplary embodiment of clearing a sensory input index. A socially intelligent agent that received the Social_Event message will update second event buffer by checking to see if its contents is a sensory input index. If the stored content is a sensory input index, the agent will clear the second event buffer 15B. The Sensory_Input and Sensory_Input_Gone functions can be called according to the cyberspace context. A developer of a particular scenario can call these functions based on a socially intelligent agent's role.

Referring to FIGS. 14 and 15, exemplary functions that support the processing of a Social_Event message that is related to a danger response are illustrated. As shown in FIG. 14, the agent calling the Danger_Response function determines if the agent has received a Social_Event message. If so, the Danger_Response function obtains the weight of the Social_Response message currently buffered in the second event buffer 15B. If the weight of the new danger response index is greater than the Social_Response message currently stored in the second event buffer 15B, the danger response index is written into the second event buffer 15B. As mentioned previously, the weights of the sensory input index and the danger response index are predefined and the weight of danger response index is bigger than that of the sensory input index. Therefore, a Social_Response message manifested as a danger response index will overwrite a Social_Response message manifested as a sensory input index. FIG. 15 illustrates an exemplary procedure for clearing the danger response index from the second event buffer 15B. The Danger_Response and Danger_Response_Gone functions can be called according to the cyberspace context. A developer of a particular scenario can call these functions based on a socially intelligent agent's role.

Referring to FIG. 16, after the social response generator 13 has processed the Social_Event message and output a Social_Response message (if dictated by the agent programming) and updated the emotional state register 12 and/or the current emotion index (if dictated by the agent programming), the emotion generator 14 creates and outputs an Emotion_Response message. As shown in FIG. 1, the creation of an Emotion_Response message is triggered by the Generate_Emotion flag from the manifester 17. There are different Emotion_Response messages, and the Emotion_Response messages are output into emotion categories. As with the event buffer 15, the emotion categories have differing validity lengths. The generated Emotion_Response messages are based on at least one or more outputs from the predefined personality trait register 11, one or more outputs from the emotional state register 12 and/or the Social_Response message stored in the event buffer 15.

The emotion categories comprise at least a lasting emotion category, a short-lived emotion category and a momentary emotion category. For the momentary emotion category, its validity length is determined by an unexpected response index generated by the social response generator 13. Accordingly, the emotion generator 14 generates an Emotion_Response message for the momentary emotion category that comprises at least a surprise value. For the short-lived emotion category, its validity length is determined by a danger response index or a sensory input response index generated by the social response generator 13. The emotion generator 14 generates an Emotion_Response message for the short-lived emotion category that comprises at least a disgust value or a fear value. Finally, the emotion generator 14 generates an Emotion_Response message for the lasting emotion category that indicates at least neutrality, happiness, sadness or anger.

More specifically, in FIG. 16, there is shown three exemplary functions that the emotion generator 14 uses to generate emotions. The first function illustrates the generation of a momentary emotion. As described earlier, in the exemplary embodiment of the present invention, the emotion of surprise is defined as a momentary emotion. For a particular socially intelligent agent, if the value in the first event buffer 15A is equal to an unexpected event and the degree of the unexpected event is above a particular threshold (Cb), then the first event buffer 15A is cleared and the Surprise message is returned in the short-lived emotion category. The threshold Cb can be adjusted as necessary to fine tune the emotional response of the socially intelligent agent.

With respect to the category of short-lived emotions, in the exemplary embodiment of the present invention, the emotional responses of fear and disgust are defined. As shown in FIG. 16, the value that is contained in the second event buffer 15B is examined to determine if it is a Dangerous_Event or a Sensory_Input value. If the value in the second event buffer 15B is a Dangerous_Event, then the degree of the value in the second event buffer 15B is checked to determine if the Fear or Fear_Radical messages should be output in the short-lived emotion category. The constants Cc and Ce are used to make this determination, and these constants can be adjusted to obtain the desired emotional response from the socially intelligent agent. If the value in the second event buffer 15B is a Sensory_Input, then the degree of the value in the second event buffer 15B is examined against the constants Ca and Cd to determine whether the Disgust message should be output to the short-lived emotion category. In the exemplary embodiment, the constants Ca through Ce are defined as follows in Table 2:

TABLE 2

| | |
|---|---|
| Ca | 0.5 |
| Cb | 0.5 |
| Cc | 0.8 |
| Cd | −0.9 |
| Ce | 0.5 |

For the lasting emotion category, the emotion generator 14 examines the emotional state index 41 and the agreeableness index 64 of the socially intelligent agent to output the emotions of neutrality, sadness, happiness or anger. The emotions of sadness, happiness and anger are further shaded with the modifiers of slightly and extremely. In the exemplary embodiment of the emotion generator 14, the various constants are defined as follows in Table 3:

TABLE 3

| | |
|---|---|
| CONST | 0.0 |
| CONST2 | (2.0/7.0) * 6.0 − 1.0 |
| CONST3 | (2.0/7.0) * 5.0 − 1.0 |
| CONST4 | (2.0/7.0) * 4.0 − 1.0 |
| CONST5 | (2.0/7.0) * 3.0 − 1.0 |
| CONST6 | (2.0/7.0) * 2.0 − 1.0 |
| CONST7 | (2.0/7.0) * 1.0 − 1.0 |

Referring to FIG. 17, a realization of the interpreter 16 is illustrated. As mentioned before, the interpreter 16 will be targeted to the specific type of cyberspace context in which the socially intelligent agent will be operating. In the exemplary embodiment shown in FIG. 17, the interpreter 16 is designed for a professor agent/student agents context (i.e., avatar and co-learner agent). The interpreter 16 shown in FIGS. 17-19 is shown to illustrate the principles of operation of the interpreter 16.

In FIG. 17, the exemplary embodiment of the interpreter 16 is choosing a student based on random choice, liking for a student, last answer provided by the student or a combination of last answer and liking for student. In the sub-functions that choose a student based on the professor's liking of a particular student, the agent interrelationship indices 43 are used. Although the sub-functions are greatly simplified for illustration purposes in that only two students are active and the professor agent only has to consider its liking for two students, the present invention is not limited to only a handful of socially intelligent agents. It is envisioned that a professor agent might be teaching dozens of students at one time, and as discussed previously, the agent interrelationship indices 43 are expanded to accommodate the number of socially intelligent agents that are present in a cyberspace context.

Referring to FIG. 18, another function of the interpreter 16 is shown called Teacher_Call_Student. In this exemplary function, a Social_Event is generated and is forwarded to the student agents present in the cyberspace context that was mentioned in conjunction with FIG. 17. The Teacher_Call_Student function invokes the Task_Request function and passes along the parameters of who is invoking the Task_Request function, which agent is targeted by the Task_Request function, and the degree of difficulty for the requested task. The Teacher_Call_Student function also calls the Dangerous_Event function to set the proper indices in the second event buffer 15B, if necessary. The Teacher_Call_Student function also calls several manifesting functions to manifest the professor agent's actions via graphics on the user interface.

Referring to FIG. 19, another exemplary function of the interpreter 16 is shown. The Teacher_Give_Answer_Feedback function looks at the answer provided by the student agent and generates a Social_Event by calling the Task_Feedback function to update the student agent's emotional states. The function uses the degree of difficulty parameter to indicate to the Task_Feedback function that the targeted student agent was successful or unsuccessful in properly answering the professor agent's question.

Referring to FIG. 20, an exemplary embodiment of the manifester 17 is illustrated. A function for manifesting the various responses of the professor agent is given. As discussed in FIG. 17, the agent interrelationship indices 43 are examined to determine the relationship between the professor agent and the student agents. For example, if the agent interrelationship between the professor agent and a particular student agent is good (i.e., greater than zero), then the tone of the professor's script is different from the tone of the professor's script if the interrelationship between the professor agent and the student agent is not good (i.e., less than zero).

Referring to FIG. 21, another task that is executed by the interpreter 16 is illustrated. This particular task is for a student agent, and thus, since the student is responding to the professor agent, more of the student agent tasks will be concentrated in the manifester 17. However, the Teacher_Give_Answer_Feedback task updates the emotions of the student agent (i.e., UserInterface. updateEmotion function call). In addition, the Teacher_Give_Answer_Feedback task also will call the Unexpected_Event function to set the appropriate value in the first event buffer 15A, as well as calling the Social_Feedback function to update various emotional states of the student agent (see FIG. 10).

Referring to FIGS. 22-24, several exemplary functions are shown that execute in the manifester 17 of a socially intelligent agent. The Teacher_Ask_Question function shown in FIG. 22 initializes text scripting flags that are used on the graphic manifestation of the interaction between the professor agent and the student agents, as well as updating the current emotional states of the student agent. The Student_Give_Answer function shown in FIG. 23 initializes the text scripting that are used on the graphic manifestation of the interaction between the professor agent and the student agents and identifies if the answer of the student agent was correct/incorrect, and sets up various flags for the different scripts that will be run based on whether the answer was correct/incorrect. In FIG. 24, a function for manifesting the various responses of a student agent is shown. In the exemplary function, the agent current confidence index 42, the agent interrelationship indices 43 and the agent predefined personality traits are examined to determine the relationship between the student agents. For example, if the agent interrelationship between the student agents are good (i.e., greater than zero), then the tone of one student agent's response to the other student agent's answer to the professor agent's question is supportive. However, if the agent interrelationship is not good based on the agent interrelationship indices 43, then the tone of one student agent's response to the other student agent's answer to the professor agent's question can be unsupportive or negative in nature.

In an alternative embodiment of the present invention, a socially intelligent agent 10 comprises a software agent embodied in computer executable code for execution on a computer. The software agent comprises a software-based interpreter that receives an Input_Event message and outputs a Social_Event message based on the interpretation of the Input_Event message. The software agent also comprises a software-based social response generator that receives the Social_Event message, a plurality of predefined personality trait indices stored in a personality trait register 11 and a plurality of emotional state indices stored in an emotional state register 12. The social response generator will perform at least one of two tasks: updating the current state of the emotional state register and storing a Social_Response message in an event buffer. The software agent further comprises a software-based emotion generator that outputs an Emotion_Response message based on at least one of a personality trait index that is output from the predefined personality trait register 11, the emotional state index 41 output from the emotional state register 12 and/or the plurality of emotional state values. The software agent further comprises a software-based manifester that receives the Emotion_Response message output from the emotion generator and converts the Emotion_Response message into an Agent_Behavior message. The software agent uses a role database that comprises social characteristics. These social characteristics are used by the interpreter to create Social_Event messages and data used by the manifester to convert the Emotion_Response message into the Agent Behavior message. This embodiment of the present invention includes all the features of the first embodiment described above with respect to the characteristics and operation of the social response generator, the emotion generator, the interpreter, the manifester, the emotional state register 12, the personal trait register, the event buffer 15, the emotion categories, etc.

In an alternative embodiment of the present invention, an article of manufacture, which comprises a computer readable medium having stored therein a computer program for an agent, comprises a socially intelligent agent 10 embodied in computer executable code for execution on a computer. The computer executable code comprises a first code portion that receives an Input_Event message and outputs a Social_Event message based on the interpretation of the Input_Event message. The software agent also comprises a second code portion that receives the Social_Event message, a plurality of predefined personality trait indices stored in a personality trait register 11 and a plurality of emotional state indices stored in an emotional state register 12. The second code portion will perform at least one of two tasks: updating the current state of the emotional state register and storing a Social_Response message in an event buffer. The software agent further comprises a third code portion that outputs an Emotion_Response message based on at least one of a personality trait index that is output from the predefined personality trait register 11, the emotional state index 41 output from the emotional state register 12 and/or the plurality of emotional state values. The software agent further comprises a fourth code portion that receives the Emotion_Response message output from the emotion generator and converts the Emotion_Response message into an Agent_Behavior message. The software agent uses a fifth code portion that comprises social characteristics. These social characteristics are used by the first code portion to create Social_Event messages and data used by the second code portion to convert the Emotion_Response message into the Agent_Behavior message. This embodiment of the present invention includes all the features of the first embodiment described above with respect to the characteristics and operation of the first through fifth code portions, the emotional state register 12, the personal trait register, the event buffer 15, the emotion categories, etc.

A general example of a computer (not shown) that can be used in accordance with the described embodiment will be described below.

The computer comprises one or more processors or processing units, a system memory and a bus that couples various system components comprising the system memory to processors. The bus can be one or more of any of several types of bus structures, comprising a memory bus or memory controller, a peripheral bus, an accelerated graphics port and a processor or local bus using any of a variety of bus architectures. The system memory comprises read only memory (ROM) and random access memory. A basic input/output system (BIOS) containing the routines that help to transfer information between elements within the computer, such as during boot up, is stored in the ROM or in a separate memory.

The computer further comprises a hard drive for reading from and writing to one or more hard disks (not shown). Some computers can comprise a magnetic disk drive for reading from and writing to a removable magnetic disk and an optical disk drive for reading from or writing to a removable optical disk, such as a CD ROM or other optical media. The hard drive, the magnetic disk drive and the optical disk drive are connected to the bus by an appropriate interface. The drives and their associated computer-readable media provide nonvolatile storage of computer-readable instructions, data structures, program modules and other data for the computer. Although the exemplary environment described herein employs a hard disk, a removable magnetic disk and a removable optical disk, it should be appreciated by those skilled in the art that other types of computer-readable media which can store data that is accessible by a computer, such as magnetic cassettes, flash memory cards, digital video disks, random access memories (RAMs), read only memories (ROMs), etc. may also be used in the exemplary operating environment.

A number of program modules may be stored on the hard disk, magnetic disk, optical disk, ROM or RAM, comprising an operating system, at least one or more application programs, other program modules and program data. In some computers, a user might enter commands and information into the computer through input devices such as a keyboard and a pointing device. Other input devices (not shown) may comprise a microphone, a joystick, a game pad, a satellite dish and/or a scanner. In some instances, however, a computer might not have these types of input devices. These and other input devices are connected to the processing unit through an interface coupled to the bus. In some computers, a monitor or other type of display device might also be connected to the bus via an interface, such as a video adapter. Some computers, however, do not have these types of display devices. In addition to the monitor, the computers might comprise other peripheral output devices (not shown) such as speakers and printers.

The computer can, but need not, operate in a networked environment using logical connections to one or more remote computers, such as a remote computer. The remote computer may be another personal computer, a server, a router, a network PC, a peer device or other common network node, and typically comprises many or all of the elements described above relative to the computer. The logical connections to the computer may comprise a local area network (LAN) and a wide area network (WAN). Such networking environments are commonplace in offices, enterprise-wide computer networks, intranets, and the Internet.

When used in a LAN networking environment, the computer is connected to the local network through a network interface or adapter. When used in a WAN networking environment, the computer typically comprises a modem or other means for establishing communications over the wide area network, such as the Internet. The modem, which may be internal or external, is connected to the bus via a serial port interface. In a networked environment, program modules depicted relative to the computer, or portions thereof, may be stored in the remote memory storage device. It will be appreciated that the network connections shown are exemplary and other means of establishing a communications link between the computers may be used.

Generally, the data processors of the computer are programmed by means of instructions stored at different times in the various computer-readable storage media of the computer. Programs and operating systems are typically distributed, for example, on floppy disks or CD-ROMs. From there, they are installed or loaded into the secondary memory of the computer. At execution, they are loaded at least partially into the computer's primary electronic memory. The invention described herein comprises these and other various types of computer-readable storage media when such media contain instructions or programs for implementing the steps described below in conjunction with a microprocessor or other data processor. The invention also comprises the computer itself when programmed according to the methods and techniques described below.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A computer system comprising a processor configured to execute computer-readable instructions stored on a non-transitory computer-readable medium, the computer-readable instructions being configured to implement an agent comprising:

an interpreter that receives an input event and outputs a social event based on the interpretation of the input event;

a social response generator that receives the social event, an output from an emotional state register and an output from a predefined personality trait register, and updates at least one of a current state of the emotional state register and a social response message stored an event buffer;

an emotion generator that outputs an emotion response message based on at least one of the social response message stored in the event buffer, one or more outputs of the predefined personality trait register, or one or more outputs of the emotional state register;

a manifester that receives the emotion response message output from the emotion generator and converts the emotion response message into a behavior message; and a role database comprising social characteristics used by the interpreter to create social events and data used by the manifester to convert the emotion response message into the behavior message.

2. The computer system according to claim 1, wherein the emotional state register comprises a current emotion index, wherein predefined thresholds associated with the current emotion index represent at least one of the emotions of neutrality, happiness, sadness or anger.

3. The computer system according to claim 1, wherein the emotional state register comprises a current confidence index, wherein the confidence level of the agent is represented as numerical value.

4. The computer system according to claim 1, wherein the emotional state register comprises at least one or more of an agent interrelationship index, wherein the agent interrelationship index is indicative of relationships with other agents that receive input events, other agents that output behavior messages or other agents that observe an input event or a behavior message.

5. The computer system according to claim 1, wherein the social response generator updates a current state of the emotional state register based on at least the social event or the output from the predefined personality trait register.

6. The computer system according to claim 1, wherein the event buffer comprises a first buffer and a second buffer.

7. The computer system according to claim 6, wherein the social response generator generates an unexpected response index that is stored in the first buffer.

8. The computer system according to claim 6, wherein the social response generator generates a sensory input index that is stored in the second buffer.

9. The computer system according to claim 6, wherein the social response generator generates a danger response index that is stored in the second buffer.

10. The computer system according to claim 6, wherein a social response message stored in the first buffer is maintained for a predetermined first period of time, and a social response message stored in the second buffer is maintained for a predetermined second period of time, wherein the first period of time is shorter than the second period of time.

11. The computer system according to claim 10, wherein the social response generator clears the social response message stored in the second buffer.

12. The computer system according to claim 1, wherein the predefined personality trait register comprises at least one of an intelligence index, a conscientiousness index, an extraversion index, an agreeableness index or an emotional stability index.

13. The computer system according to claim 12, wherein the predefined personality trait register further comprises at least one or more of an agent social status index, wherein the agent social status index is indicative of the social status of other agents that receive input events, other agents that output behavior messages or other agents that observe an input event or a behavior message.

14. The computer system according to claim 1, wherein the emotion generator outputs the emotion response message in emotion categories having differing validity time periods based on at least one of the social response message stored in the event buffer, one or more outputs from the predefined personality trait register, or one or more outputs from the emotional state register.

15. The computer system according to claim 14, wherein the emotion categories comprise at least a lasting emotion category, a short-lived emotion category and a momentary emotion category.

16. The computer system according to claim 15, wherein the validity time period of the momentary emotion category is determined by an unexpected response index generated by the social response generator.

17. The computer system according to claim 15, wherein the validity time period of the short-lived emotion category is determined by a danger response index or a sensory input response index generated by the social response generator.

18. The computer system according to claim 15, wherein the emotion response message generated for the lasting emotion category comprises one of a neutrality value, a happiness value, a sadness value or an anger value.

19. The computer system according to claim 15, wherein the emotion response message generated for the short-lived emotion category comprises at least one of a disgust value or a fear value.

20. The computer system according to claim 15, wherein the emotion response message generated for the momentary emotion category comprises at least a surprise value.

21. The computer system according to claim 1, wherein the interpreter determines if an input event requires processing using information from at least one of the role database, the emotional state register and the predefined personality trait register, and, if the determination is positive, creates the social event based on data input from at least one of the role database, the emotional state register and the predefined personality trait register and outputs the social event to the social response generator.

22. The computer system agent according to claim 1, wherein the interpreter determines if an input event requires processing using information from at least one of the role database, the emotional state register and the predefined personality trait register, and, if the determination is negative, converts the input event into a social event and outputs the social event to the social response generator.

23. The computer system according to claim 1, wherein the social response generator signals the interpreter after the social response generator has processed the social event and updated at least one of the emotional state register and the event buffer.

24. The computer system according to claim 23, wherein the interpreter triggers the manifester to cause the emotion generator to output the emotion response message.

25. The computer system according to claim 24, wherein the manifester processes the emotion response message using data from the role database and outputs the behavior message.

26. An article of manufacture comprising a non-transitory computer readable medium having stored therein a computer program for an agent, the computer program comprising:

a first code portion which, when executed on a computer, receives an input event and outputs a social event based on an interpretation of the input event;

a second code portion which, when executed on a computer, receives the social event, an output from an emotional state register and an output from a predefined personality trait register, and updates at least one of a current state of the emotional state register and a social response message stored an event buffer;

a third code portion which, when executed on a computer, outputs an emotion response message based on at least one of the social response message stored in the event buffer, one or more outputs of the predefined personality trait register, or one or more outputs of the emotional state register;

a fourth code portion which, when executed on a computer, receives the emotion response message output from the emotion generator and converts the emotion response message into a behavior message; and a fifth code portion which, when executed on a computer, comprises social characteristics used by the first code portion to create social events and data used by the fourth code portion to convert the emotion response message into the behavior message.

27. A non-transitory computer-readable medium with computer-readable instructions stored thereon, the computer-readable instructions being configured to implement a software agent comprising:

an interpreter that receives an input event and outputs a social event based on the interpretation of the input event;

a social response generator that receives the social event, an output from an emotional state register and an output from a predefined personality trait register, and updates at least one of a current state of the emotional state register and a social response message stored an event buffer;

an emotion generator that outputs an emotion response message based on at least one of the social response message stored in the event buffer, one or more outputs of the predefined personality trait register, or one or more outputs of the emotional state register;

a manifester that receives the emotion response message output from the emotion generator and converts the emotion response message into a behavior message; and a role database comprising social characteristics used by the interpreter to create social events and data used by the manifester to convert the emotion response message into the behavior message.

28. A computer system comprising a processor configured to execute computer-readable instructions stored on a non-transitory computer-readable medium, the computer-readable instructions being configured to implement a virtual environment comprising:

a plurality of software agents according to claim 27; and a scenario environment that receives user inputs and outputs input events, wherein the scenario environment receives a behavior message from a software agent and converts the behavior message into graphical representations of the software agent's emotional response to an input event.

29. The computer system according to claim 28, further comprising a scenario database, coupled to the scenario environment, for providing a cyberspace context that allows the plurality of agents to interact with each other.

30. The computer system according to claim 29, wherein the scenario database comprises a plurality of different cyberspace contexts.

31. The computer system according to claim 28, further comprising a scenario database, coupled to the scenario environment, for providing a cyberspace context that graphically depicts the interaction between the plurality of software agents based on behavior messages received from the plurality of software agents.

32. A method for causing a processor to execute computer-readable instructions stored on a non-transitory computer-readable medium, the computer readable instructions comprising:

generating emotional responses for a software agent, comprising: receiving and interpreting an input event based on stored social characteristics and outputting a social event based on the interpretation of the input event;

receiving the social event, an output from an emotional state register and an output from a predefined personality trait register, and updating at least one of a current state of the emotional state register and a social response message stored an event buffer;

outputting an emotion response message based on at least one of the social response message stored in the event buffer, one or more outputs of the predefined personality trait register, or one or more outputs of the emotional state register; and receiving the emotion response message output from the emotion generator and converting the emotion response message into a behavior message based on stored social characteristics.

33. The method according to claim 32, wherein the emotional state register comprises a current emotion index, wherein predefined thresholds associated with the current emotion index represent at least one of the emotions of neutrality, happiness, sadness or anger.

34. The method according to claim 32, wherein the emotional state register comprises a current confidence index, wherein the confidence level of the software agent is represented as numerical value.

35. The method according to claim 32, wherein the emotional state register comprises at least one or more of an agent interrelationship index, wherein the agent interrelationship index is indicative of relationships with other software agents that receive input events, other software agents that output behavior messages or other software agents that observe an input event or a behavior message.

36. The method according to claim 32, wherein the updating of the current state of the emotional state register based on at least the social event or the output from the predefined personality trait register.

37. The method according to claim 32, wherein the event buffer comprises a first buffer and a second buffer.

38. The method according to claim 37, wherein the social response generator generates an unexpected response index that is stored in the first buffer.

39. The method according to claim 37, wherein the social response generator generates a sensory input index that is stored in the second buffer.

40. The method according to claim 37, wherein the social response generator generates a danger response index that is stored in the second buffer.

41. The method according to claim 32, wherein the predefined personality trait register comprises at least one of an intelligence index, a conscientiousness index, an extraversion index, an agreeableness index or an emotional stability index.

42. The method according to claim 41, wherein the predefined personality trait register further comprises at least one or more of an agent social status index, wherein the agent social status index is indicative of the social status of other software agents that receive input events, other software agents that output behavior messages or other software agents that observe an input event or a behavior message.

43. The method according to claim 32, wherein the emotion response message is output in emotion categories having differing validity time periods based on at least one of the social response message stored in the event buffer, one or more outputs from the predefined personality trait register, or one or more outputs from the emotional state register.

44. The method according to claim 42, wherein the emotion categories comprise at least a lasting emotion category, a short-lived emotion category and a momentary emotion category.

45. The method according to claim 43, wherein the emotion response message generated for the lasting emotion category comprises one of a neutrality value, a happiness value, a sadness value or an anger value.

46. The method according to claim 43, wherein the emotion response message generated for the short-lived emotion category comprises at least one of a disgust value or a fear value.

47. The method according to claim 43, wherein the emotion response message generated for the momentary emotion category comprises at least a surprise value.

48. The method according to claim 32, further comprising a determination if an input event requires processing using information from at least one of the role database, the emotional state register and the predefined personality trait register, and, if the determination is positive, creating the social event based on data input from at least one of the role database, the emotional state register and the predefined personality trait register and outputting the social event to the social response generator.

49. The method according to claim 32, further comprising a determination if an input event requires processing using information from at least one of the role database, the emotional state register and the predefined personality trait register, and, if the determination is negative, converting the input event into a social event and outputting the social event to the social response generator.

50. The method according to claim 32, wherein the method further comprises generating the emotion response message after the social event has been processed, and outputting the behavior message based on social characteristics applied to the emotional response message.

* * * * *